(12) United States Patent
D'Emidio et al.

(10) Patent No.: US 10,829,267 B2
(45) Date of Patent: *Nov. 10, 2020

(54) REPAIRABLE PLASTIC PALLET WITH GROMMETS IN THE TOP DECK AND ASSOCIATED METHODS

(71) Applicant: CHEP Technology Pty Limited, Sydney (AU)

(72) Inventors: Brandon Michael D'Emidio, Roswell, GA (US); Ricardo Martin Garcia, Orlando, FL (US); Daniel Aaron Gorsky, Lebanon, OH (US); Paul J. Siebert, Melbourne, FL (US); Robert G. States, III, Morrow, OH (US); Paul Barnswell, Debary, FL (US); Joseph Adam Gainey, Apopka, FL (US)

(73) Assignee: CHEP Technology Pty Limited, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,416

(22) Filed: Feb. 12, 2020

(65) Prior Publication Data

US 2020/0180812 A1 Jun. 11, 2020

Related U.S. Application Data

(63) Continuation of application No. 16/421,665, filed on May 24, 2019, now Pat. No. 10,562,666.

(Continued)

(51) Int. Cl.
*B65D 19/00* (2006.01)

(52) U.S. Cl.
CPC ..... *B65D 19/0073* (2013.01); *B65D 19/0016* (2013.01); *B65D 2519/00034* (2013.01);
(Continued)

(58) Field of Classification Search
CPC .. B65D 2519/00034; B65D 2519/0084; B65D 2519/00069; B65D 2519/00104;
(Continued)

(56) References Cited

U.S. PATENT DOCUMENTS 3,307,504 A 3/1967 Issue Date:
4,051,787 A * 10/1977 Nishitani ........... B65D 19/0012
108/55.3

(Continued)

FOREIGN PATENT DOCUMENTS

CA 2336484 1/2000
CA 2463064 5/2003
(Continued)

OTHER PUBLICATIONS

English Translation of Brandenburg (FR2544287) (Year: 2020).*

*Primary Examiner* — Matthew W Ing
(74) *Attorney, Agent, or Firm* — Allen, Dyer, Doppelt & Gilchrist, PA

(57) ABSTRACT

A pallet includes a top deck having an upper surface and an opposing lower surface. The top deck includes grommet openings extending therethrough, and grommets are inserted into the grommet openings. Each grommet includes an upper section having an outer exposed surface extending above the upper surface of the top deck, and at least one lower section having an outer exposed surface extending below the lower surface of the top deck.

20 Claims, 35 Drawing Sheets

Related U.S. Application Data

(60) Provisional application No. 62/678,402, filed on May 31, 2018.

(52) U.S. Cl.
CPC .............. *B65D 2519/00069* (2013.01); *B65D 2519/00104* (2013.01); *B65D 2519/00273* (2013.01); *B65D 2519/00288* (2013.01); *B65D 2519/00293* (2013.01); *B65D 2519/00318* (2013.01); *B65D 2519/00333* (2013.01); *B65D 2519/00373* (2013.01); *B65D 2519/00567* (2013.01)

(58) Field of Classification Search
CPC ........... B65D 2519/00273; B65D 2519/00288; B65D 2519/00318; B65D 2519/00333; B65D 2519/00373; B65D 2519/00567; B65D 19/0016
USPC .................................................... 108/57.25
See application file for complete search history.

(56) References Cited

U.S. PATENT DOCUMENTS

| | | |
|---|---|---|
| 4,316,419 A | 2/1982 | Cupido |
| 4,735,154 A | 4/1988 | Hemery |
| 4,843,976 A | 7/1989 | Pigott et al. |
| 5,404,829 A | 4/1995 | Shuert |
| 5,413,052 A | 5/1995 | Breezer et al. |
| 5,579,686 A | 12/1996 | Pigott et al. |
| 5,791,261 A | 8/1998 | John et al. |
| 5,794,544 A | 8/1998 | Shuert |
| 5,887,529 A | 3/1999 | John et al. |
| 6,021,721 A | 2/2000 | Rushton |
| 6,029,583 A | 2/2000 | LeTrudet |
| 6,109,190 A | 8/2000 | Hale et al. |
| 6,173,659 B1 | 1/2001 | Danks et al. |
| 6,199,488 B1 | 3/2001 | Favaron et al. |
| 6,216,609 B1 | 4/2001 | Frankenberg |
| 6,357,366 B1 | 3/2002 | Frankenberg |
| 6,508,182 B1 | 1/2003 | Smorgan et al. |
| 6,622,642 B2 | 9/2003 | Ohanesian |
| 6,705,237 B2 | 3/2004 | Moore, Jr. et al. |
| 6,807,910 B2 | 10/2004 | Apps |
| 6,811,125 B1 | 11/2004 | Koefelda et al. |
| 7,086,339 B2 | 8/2006 | Apps et al. |
| 7,165,499 B2 | 1/2007 | Apps et al. |
| 7,640,867 B2 | 1/2010 | Ogburn et al. |
| 7,779,765 B2 | 8/2010 | Donnell, Jr. et al. |
| 7,908,979 B2 | 3/2011 | Yoshida et al. |
| 8,056,488 B2 | 11/2011 | Apes et al. |
| 8,127,691 B2 | 3/2012 | Ingham |
| 8,573,137 B2 | 11/2013 | Seger |
| 8,770,115 B2 | 7/2014 | Apps et al. |
| 8,950,342 B2 | 2/2015 | Plattner |
| 9,452,864 B2 | 9/2016 | Apps |
| 9,714,116 B2 | 7/2017 | Rader et al. |
| 10,562,666 B2 * | 2/2020 | D'Emidio .......... B65D 19/0016 |
| 2007/0137533 A1 | 6/2007 | Carson et al. |
| 2010/0212553 A1 | 8/2010 | Baltz |
| 2010/0326334 A1 | 12/2010 | Lin |
| 2011/0162563 A1 | 7/2011 | Ogburn et al. |
| 2011/0259248 A1 | 10/2011 | Grgac et al. |
| 2011/0259249 A1 | 10/2011 | Ogburn et al. |
| 2012/0240827 A1 | 9/2012 | Hidalgo |
| 2012/0325125 A1 | 12/2012 | Apps et al. |
| 2013/0174762 A1 | 7/2013 | Hedley et al. |
| 2014/0137775 A1 | 5/2014 | Plattner |
| 2016/0039566 A1 | 2/2016 | Lorenz et al. |
| 2016/0288951 A1 | 10/2016 | Rader et al. |

FOREIGN PATENT DOCUMENTS

| | | | |
|---|---|---|---|
| CA | 2530629 | 6/2006 | |
| CA | 2580244 | 9/2007 | |
| CA | 2717517 | 4/2011 | |
| CA | 2780634 | 12/2012 | |
| DE | 8310685 | 7/1983 | |
| DE | 4324216 | 1/1994 | |
| FR | 2544287 A1 * | 10/1984 | ......... B65D 19/0018 |
| JP | 2010116194 | 5/2010 | |
| JP | 2012240743 | 12/2012 | |
| WO | WO9962779 | 9/1999 | |
| WO | WO2013159796 | 10/2013 | |

* cited by examiner

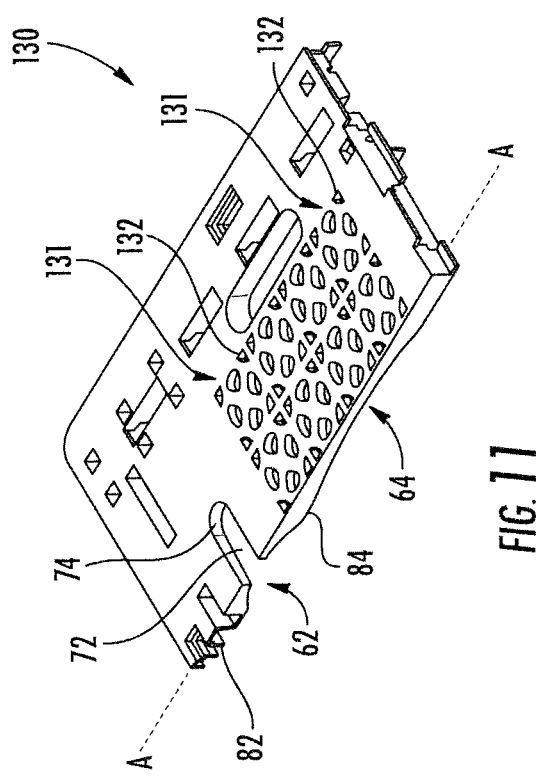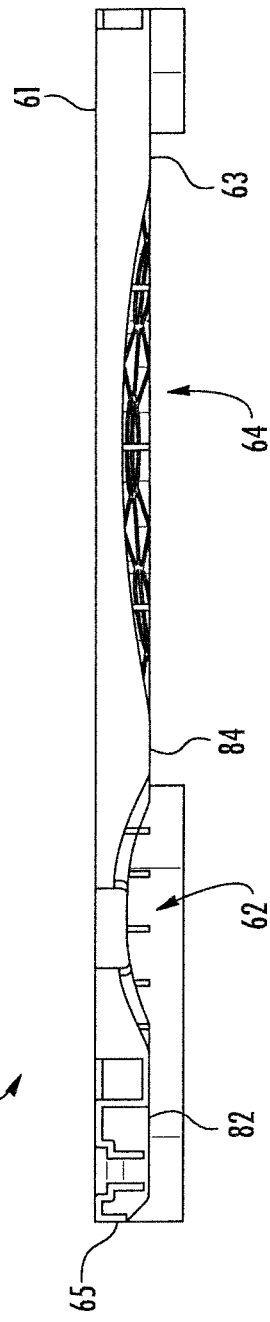
FIG. 11
FIG. 12

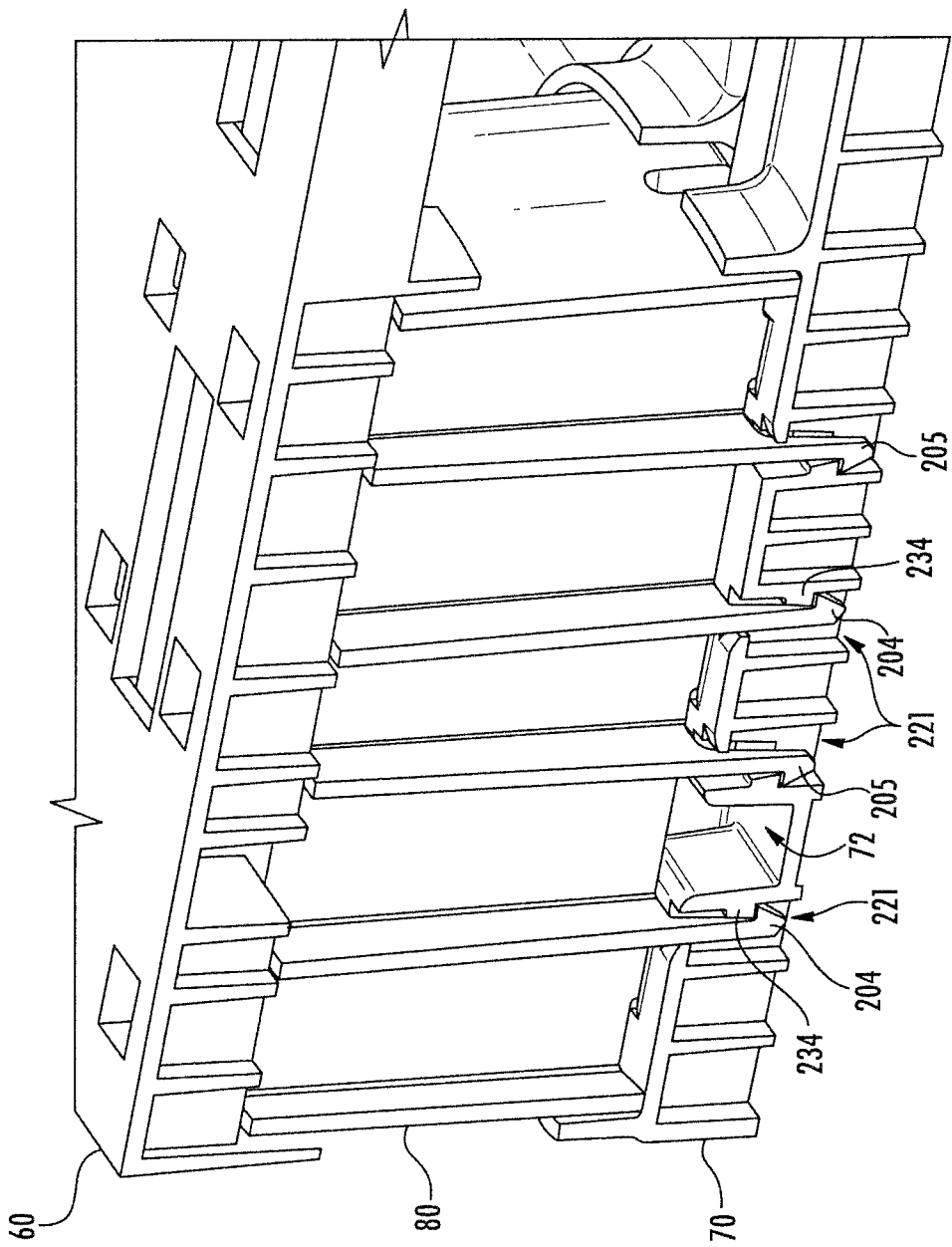

REPAIRABLE PLASTIC PALLET WITH GROMMETS IN THE TOP DECK AND ASSOCIATED METHODS

RELATED APPLICATIONS

This application is a continuation of U.S. application Ser. No. 16/421,665 filed May 24, 2019, which claims the benefit of provisional application Ser. No. 62/678,402 filed May 31, 2018, which are hereby incorporated herein in their entirety by reference.

BACKGROUND

Plastic pallets are customarily used to transport and store goods. A plastic pallet typically includes an upper deck and a lower deck separated by support blocks. The support blocks define a gap or opening between the upper and lower decks for receiving the tines from a forklift or pallet jack for moving the pallet.

In terms of durability, plastic pallets are susceptible to damage from impacts with the sharp metal tines of the forklift or pallet jack. In addition, if the tines are inserted too far between the upper and lower decks such that the wheels of the forklift or pallet jack are resting on the lower deck, then the upper deck becomes separated from the lower deck when the tines are lifted.

Depending on the extent of the damage to the plastic pallet, it may be repaired at a cost far less than replacing the entire plastic pallet. There are many types of repairable plastic pallets, as disclosed in U.S. Pat. Nos. 4,843,976; 5,413,052; and 5,791,261, for example. Even in view of these repairable plastic pallets, there is still a demand to increase durability, strength and reparability of plastic pallets.

SUMMARY

A pallet includes a top deck having an upper surface and an opposing lower surface. The top deck includes a plurality of grommet openings extending therethrough, and a plurality of grommets is inserted into the plurality of grommet openings. Each grommet includes an upper section having an outer exposed surface extending above the upper surface of the top deck, and at least one lower section having an outer exposed surface extending below the lower surface of the top deck.

The at least one lower section may include a lip resting on the lower surface of the top deck.

Each grommet opening may include a recessed shelf below the upper surface of the top deck, and wherein the upper section of each grommet may include a lower lip resting on the recessed shelf.

Each grommet may further include at least one midsection adjacent the lower lip, and may extend between the upper section and the at least one lower section.

Each grommet opening may further include a divider. The at least one mid-section may include a pair of spaced apart mid-sections, with each mid-section being separated by the divider. The at least one lower section may include a pair of lower sections, with each lower section extending from a respective mid-section.

The divider may include a lower surface even with the underside of the top deck. The divider may include an upper surface that is below the recessed shelf.

The plurality of grommet openings may be spaced adjacent a perimeter of the top deck. Each grommet opening and each grommet may be rectangular shaped.

Each grommet may include at least one of natural rubber and synthetic rubber. The top deck may include plastic.

Another aspect is directed to a method for making a pallet as described above. The method includes forming a top deck having an upper surface and an opposing lower surface, with the top deck including a plurality of grommet openings extending therethrough. The method further includes inserting a plurality of grommets into the plurality of grommet openings. Each grommet includes an upper section having an outer exposed surface extending above the upper surface of the top deck, and at least one lower section having an outer exposed surface extending below the lower surface of the top deck.

BRIEF DESCRIPTION OF THE DRAWINGS

FIGS. 11 and 12 are cross-sectional views of the quadrant shown in FIG. 9 taken along line AA.

FIGS. 31 and 32 are partial cross-sectional views of the plastic pallet illustrated in FIG. 1 through a short side and a long side of one of the large support blocks.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
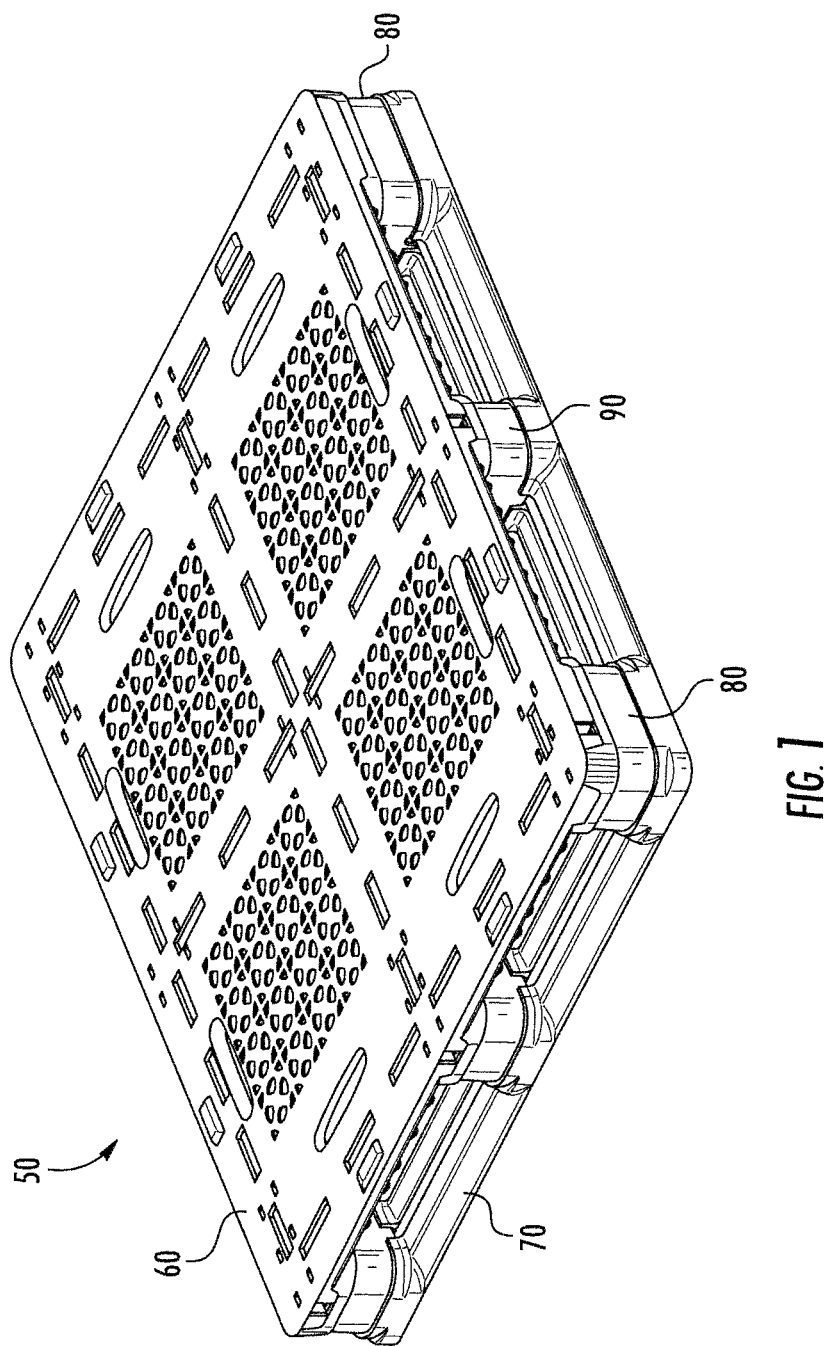
FIGS. 1 and 2 are upper and lower perspective views of a repairable plastic pallet in accordance with the disclosure.
Figure 2:
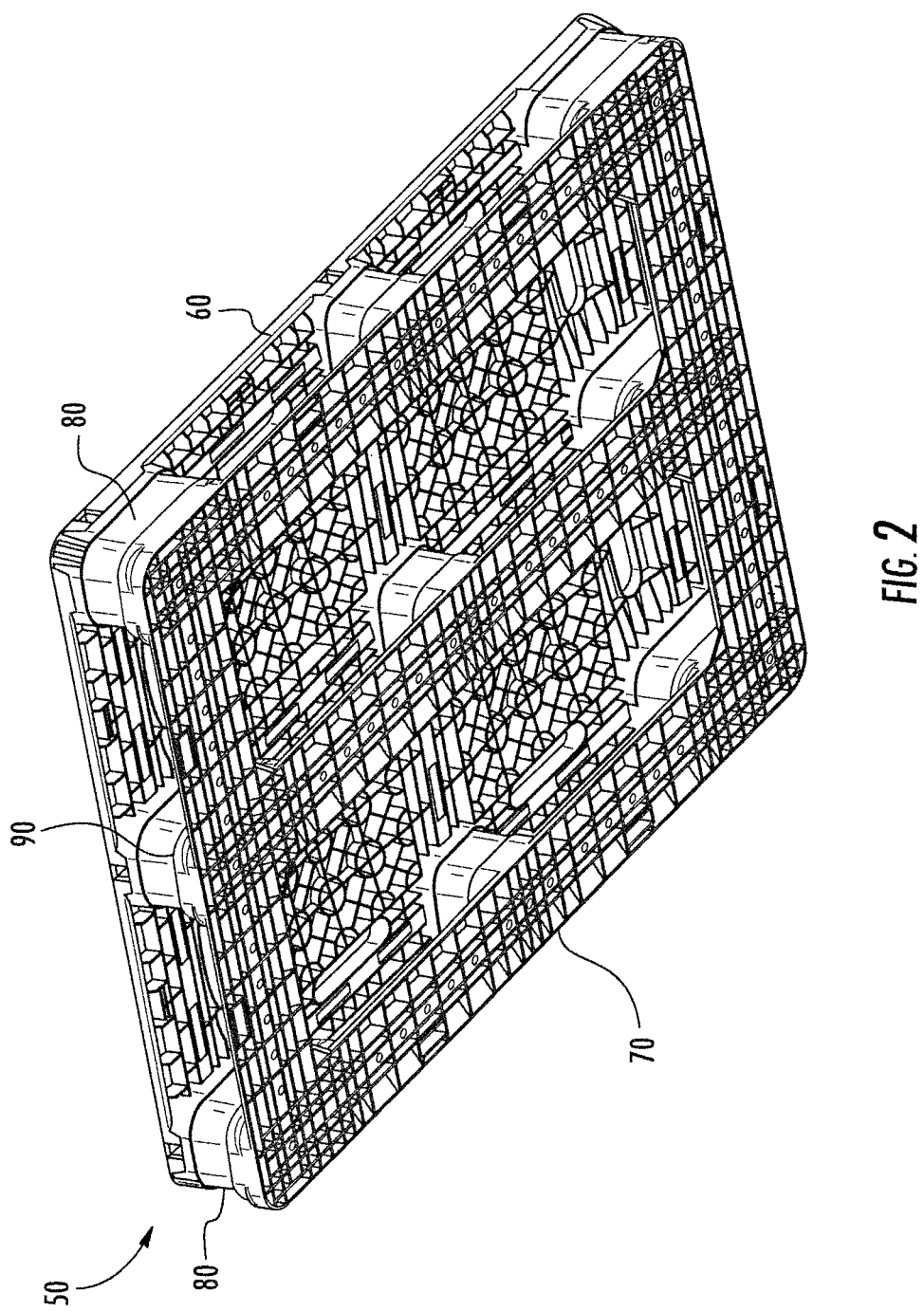
Figure 3:
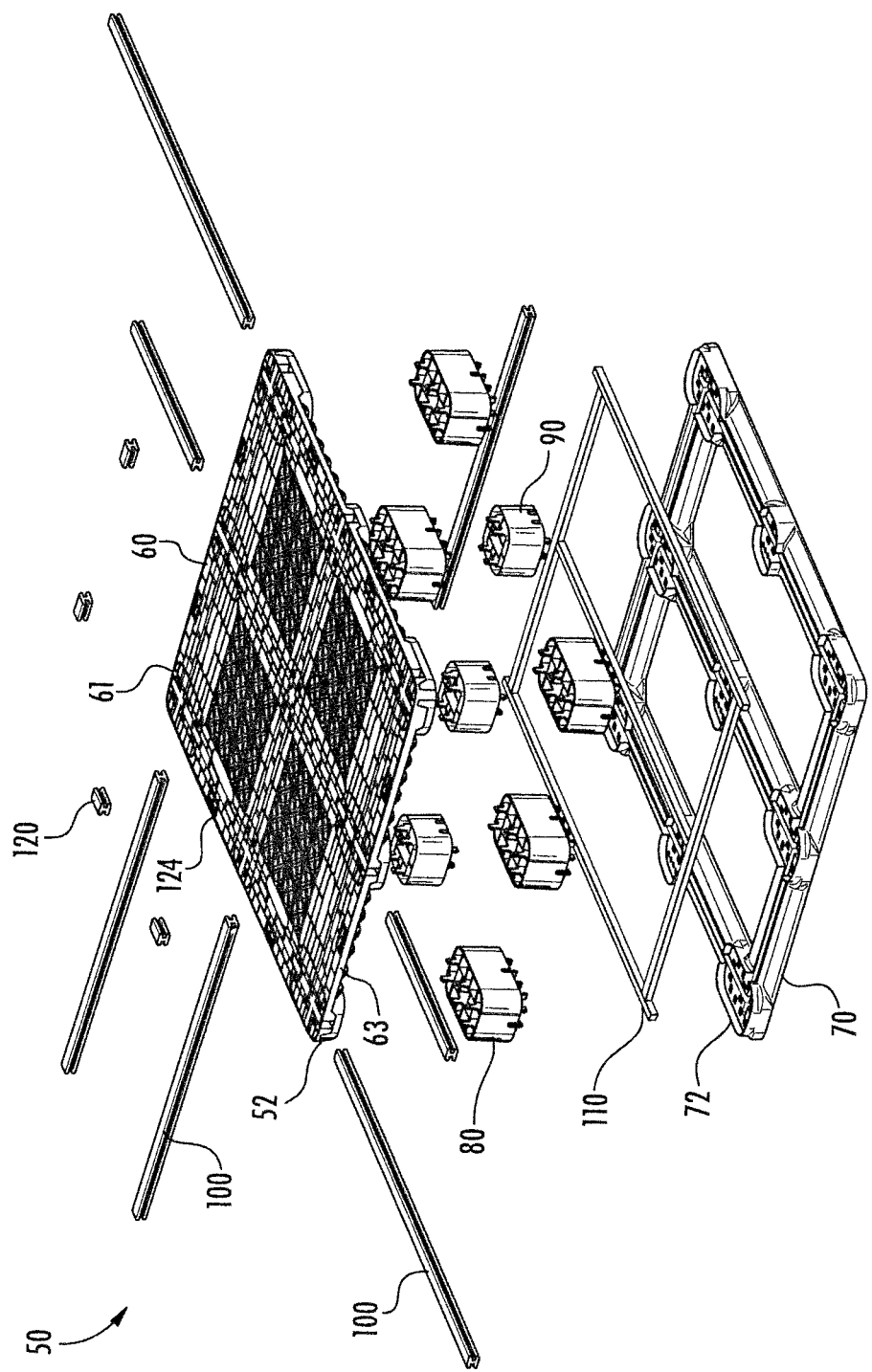
FIG. 3 is an exploded view of the repairable plastic pallet shown in FIG. 1.

Referring initially to FIGS. 1-3, the illustrated repairable plastic pallet 50 includes a top deck 60, a bottom deck 70 and removable support blocks 80, 90 separating the top and bottom decks 60, 70. The support blocks 80, 90 are positioned to enable 4-way entry by pallet handling equipment, such as a forklift or pallet jack.

The plastic pallet 50 is a standard full size pallet having dimensions of 40 inches by 48 inches, for example. These dimensions are exemplary and are not to be limiting. The plastic pallet 50 may be configured to accommodate other sizes, such as a half or quarter size pallet, for example.

An exploded view of the plastic pallet 50 is provided in FIG. 3. The top deck 60 includes a support structure made up of individual support structure members 100. Each support structure member 100 is inserted into a respective side opening 52 within the top deck 60. Each side opening 52 is aligned with a channel that is to receive a support structure member 100. The bottom deck 70 also includes a support structure 110. The support structure 110 may be formed as a single unit that is dropped into open channels 72 within the bottom deck 70 during assembly of the plastic pallet 50. Alternatively, the support structure 100 may be formed as individual support structure members that are dropped into the open channels 72 within the bottom deck 70 during assembly of the plastic pallet 50.

The illustrated plastic pallet 50 includes 9 support blocks, wherein 6 of the support blocks 80 are referred to as large support blocks. The remaining 3 support blocks 90 are referred to as small support blocks. If any of the support blocks 80, 90 become damaged, the plastic pallet 50 may be repaired by replacing only the damaged support blocks 80, 90. Similarly, if the top or bottom deck 60, 70 becomes damaged, the plastic pallet 50 may be repaired by replacing the damaged top or bottom deck 60, 70.

The large support blocks 80 are at the corners of the plastic pallet 50 and between the corners on one of the opposing sides of the plastic pallet 50. The small support blocks 90 are between the corners on the other opposing sides of the plastic pallet 50, and in the center of the plastic pallet 50.

Also shown in the exploded view are grommets 120 that are inserted into openings 124 within the top deck 60. The grommets 120 are exposed on the upper surface 61 of the top deck 60, and are exposed on an opposing lower surface 63 of the top deck 60. The upper surface 61 of the plastic pallet 50 may also be referred to as a product support surface. Exposure of the grommets 120 on the product support surface helps to provide a better grip when items are placed thereon. Exposure of the grommets 120 on the lower surface 63 of the top deck 60 helps to provide a better grip with pallet handling equipment.

Figure 4:
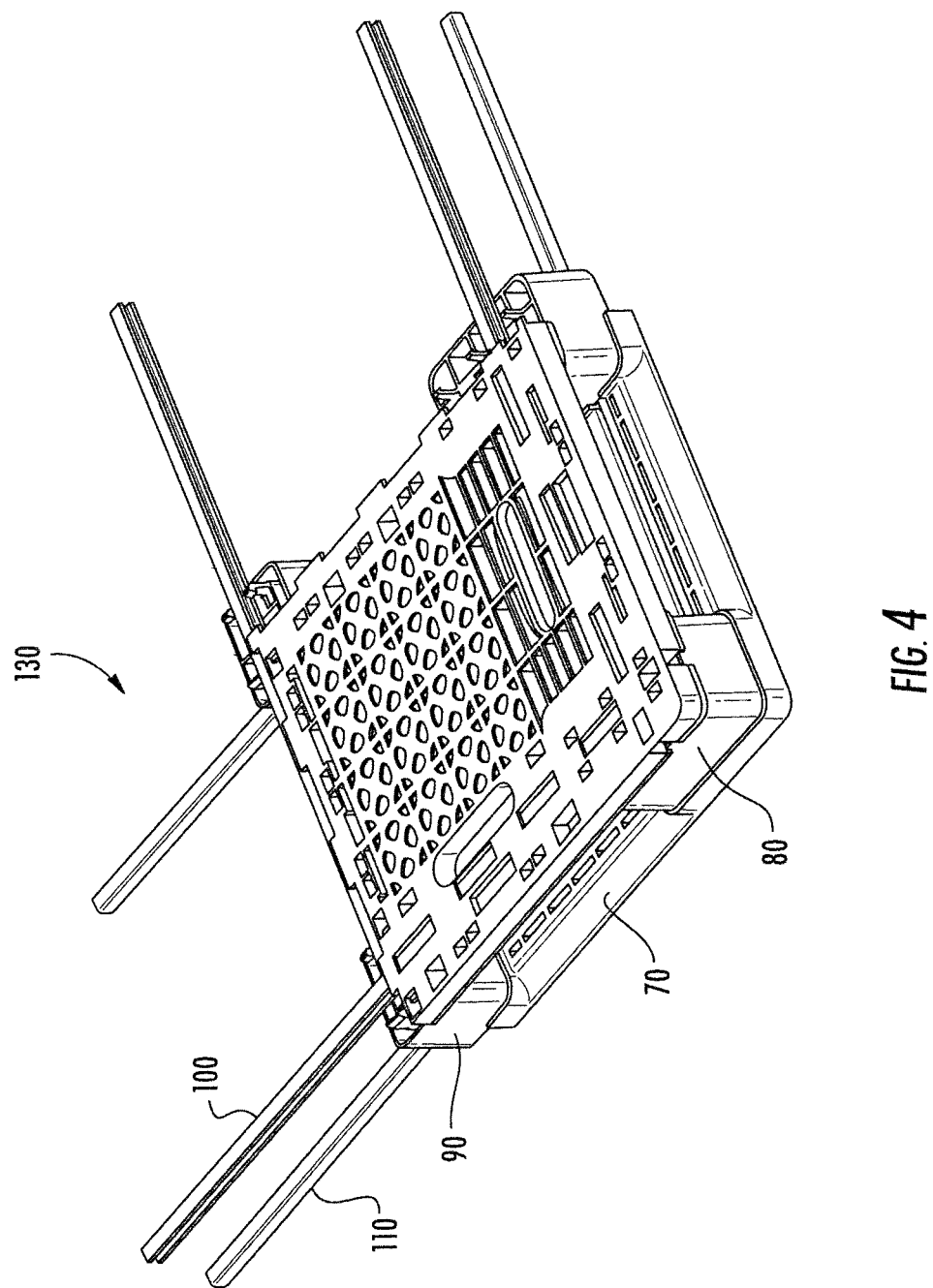
FIGS. 4 and 5 are upper and lower perspective views of a single quadrant of the full size pallet shown in FIG. 1.
Figure 5:
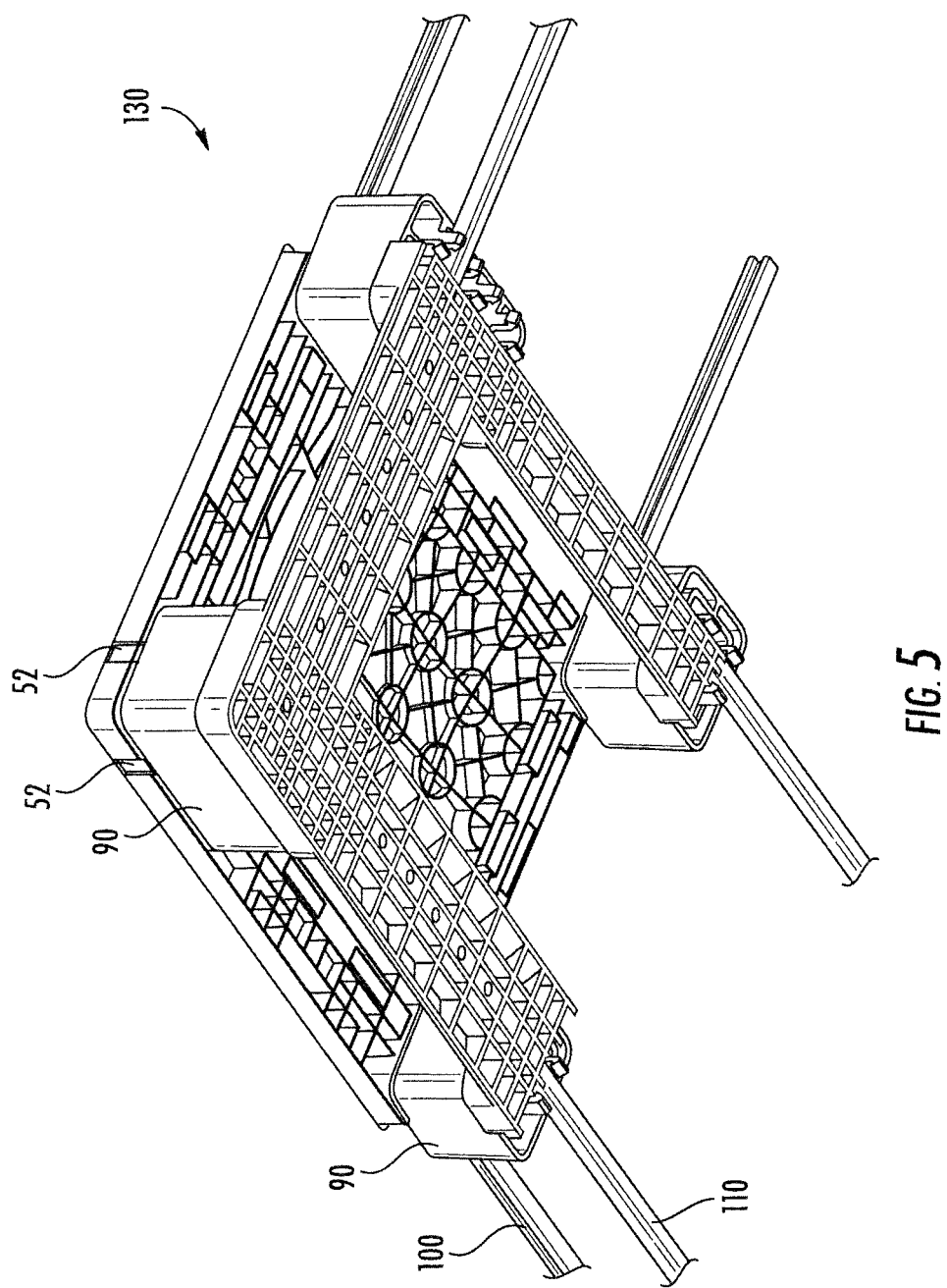

The top deck 60 and the bottom deck 70 respectively have symmetrical quadrants 130. Upper and lower perspective views of a single quadrant 130 of the plastic pallet 50 are illustrated in FIGS. 4 and 5.

Even though only a single quadrant 130 is shown, the top and bottom decks 60, 70 are respectively formed as monolithic units with all four quadrants integrated together for each deck 60, 70. The symmetrical quadrants do not require positioning of the top and bottom decks 60, 70 in any particular orientation when joined with the support blocks 80, 90 other than having the short sides aligned together and the long sides aligned together.

Figure 6:
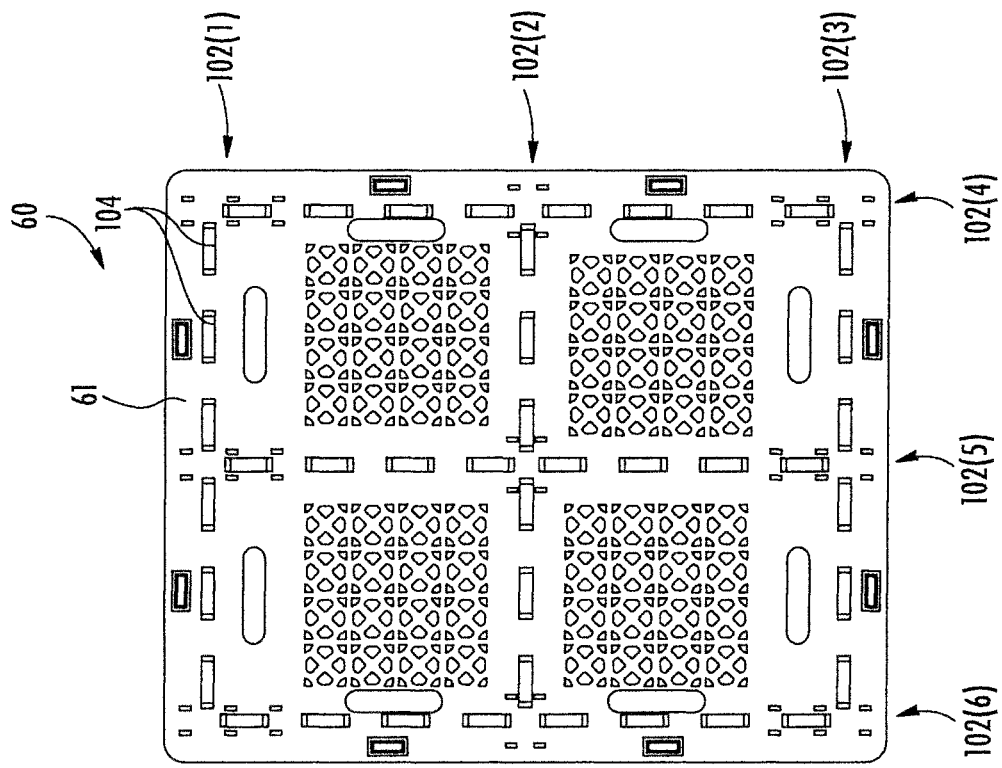
FIGS. 6 and 7 are top and bottom views of the top deck shown in FIG. 1.
Figure 7:
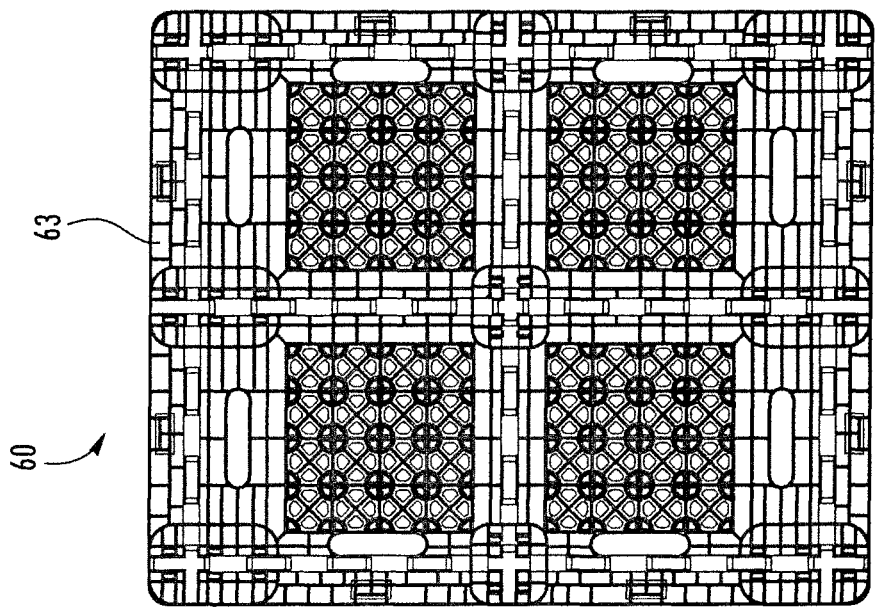

The top deck 60 includes a product support surface 61 as illustrated in FIG. 6, and an underside 63 as illustrated in FIG. 7. The top deck 60 includes support structure members 100 for strengthening the plastic pallet 50. There are 6 channels 102 extending through the top deck 60. Direction of the channels are marked by arrows 102(1)-102(6). Each channel 102 extends from one side of the top deck 60 to the other side of the top deck 60.

Each support structure member 100 is inserted through a respective side opening 52 within the top deck 60. In one embodiment, there is a side opening 52 at each end of the channels 102. In other embodiments, there is a side opening 52 at only one end of each channel 102, with the other end being closed off by the side or edge of the top deck 60 or by plugs. Once the support structure members 100 have been inserted into their respective channels 102, plugs are used to close off the remaining side openings 52.

The top deck 60 includes openings 104 to expose the support structure members 100 within the channels 102. In the illustrated top deck 60, there are 8 openings 104 per channel 102 on the long side of the top deck 60, and 6 openings 104 per channel 102 on the short side of the top deck 60. The size of the opens 104 within the top deck 60 may vary, as well as the number of openings.

Figure 8:
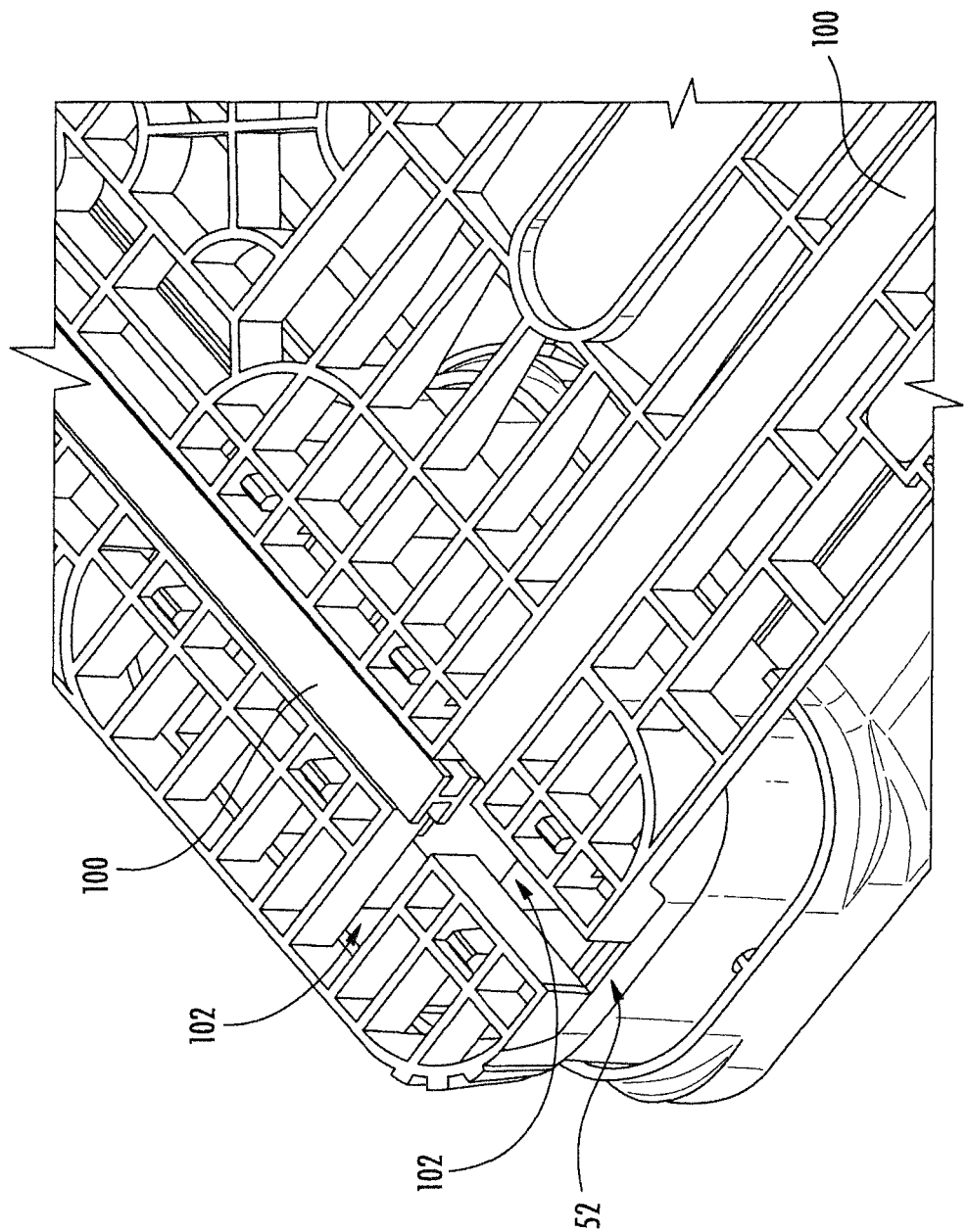
FIG. 8 is a partial cross-sectional view of the top deck shown in FIG. 1 exposing structure support members.

A partial cross-section view of the top deck 60 is provided in FIG. 8 exposing two of the support structure members 100. One of the support structure members 100 blocks the other support structure member 100 at intersecting channels 102. Each support structure member 100 may be configured as a pultrusion having an I-beam shape. The support structure members 100 are self-contained within the top deck 60 and do not contact the support blocks 80, 90. The support structure members 100 are not limited to having an I-beam shape. The support structure members 100 may be formed having other cross-sectional shapes.

One aspect of the disclosure is directed to the top deck 60 including at least one deck scoop area on an underside thereof, with a thickness of the top deck 60 being reduced in the at least one deck scoop area to reduce influence of top deck deflection on ability of the lifting member to pass through the opening between the top and bottom decks 60, 70. In one embodiment, the top deck 60 may include a single large-sized deck scoop area centered on an underside 63 of the top deck 60. In other embodiments, the top deck 60 may include multiple small-sized deck scoop areas spaced apart on the underside 63 of the top deck 60.

Figure 9:
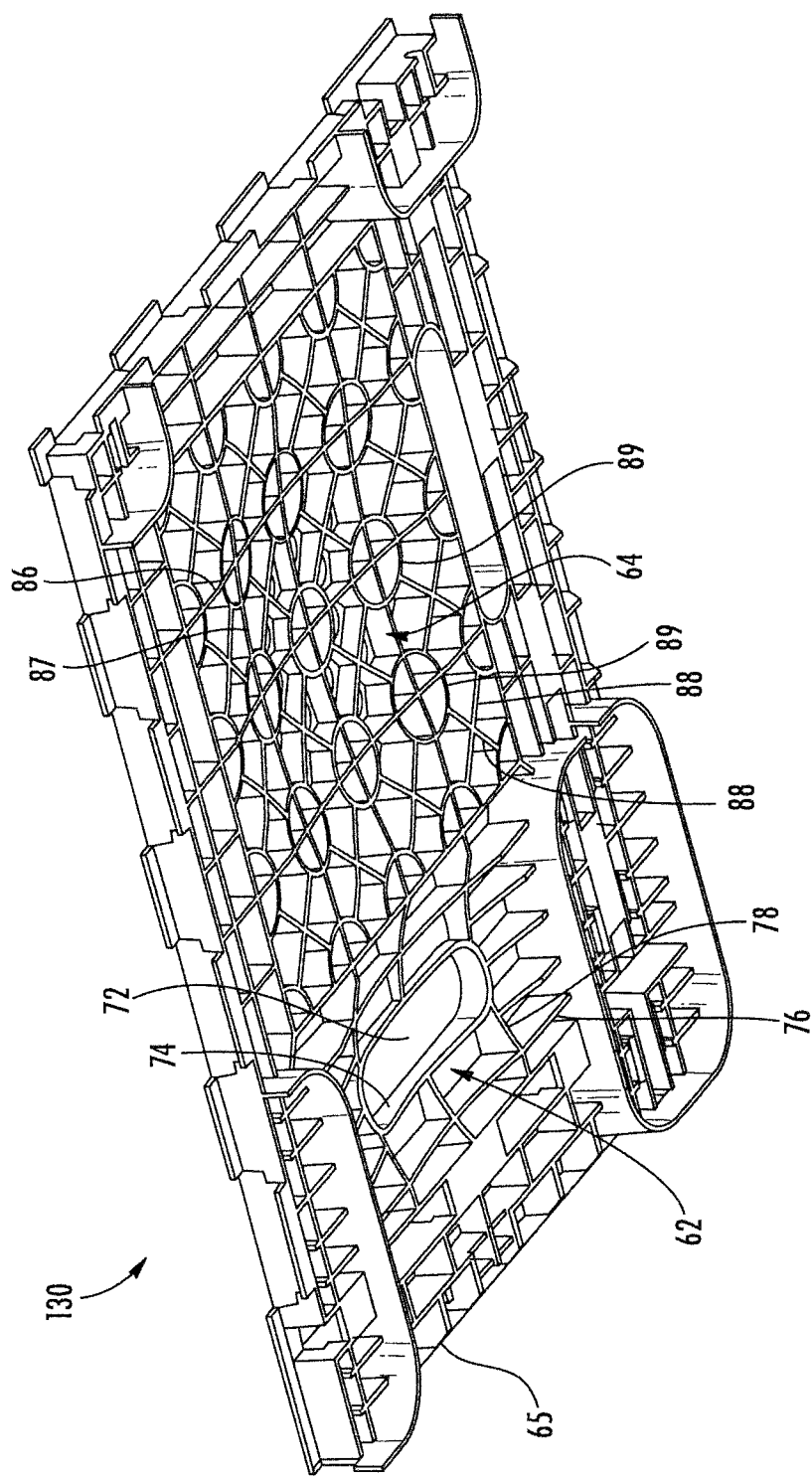
FIG. 9 is a lower perspective view of a single quadrant of the full size pallet shown in FIG. 1.
Figure 10:
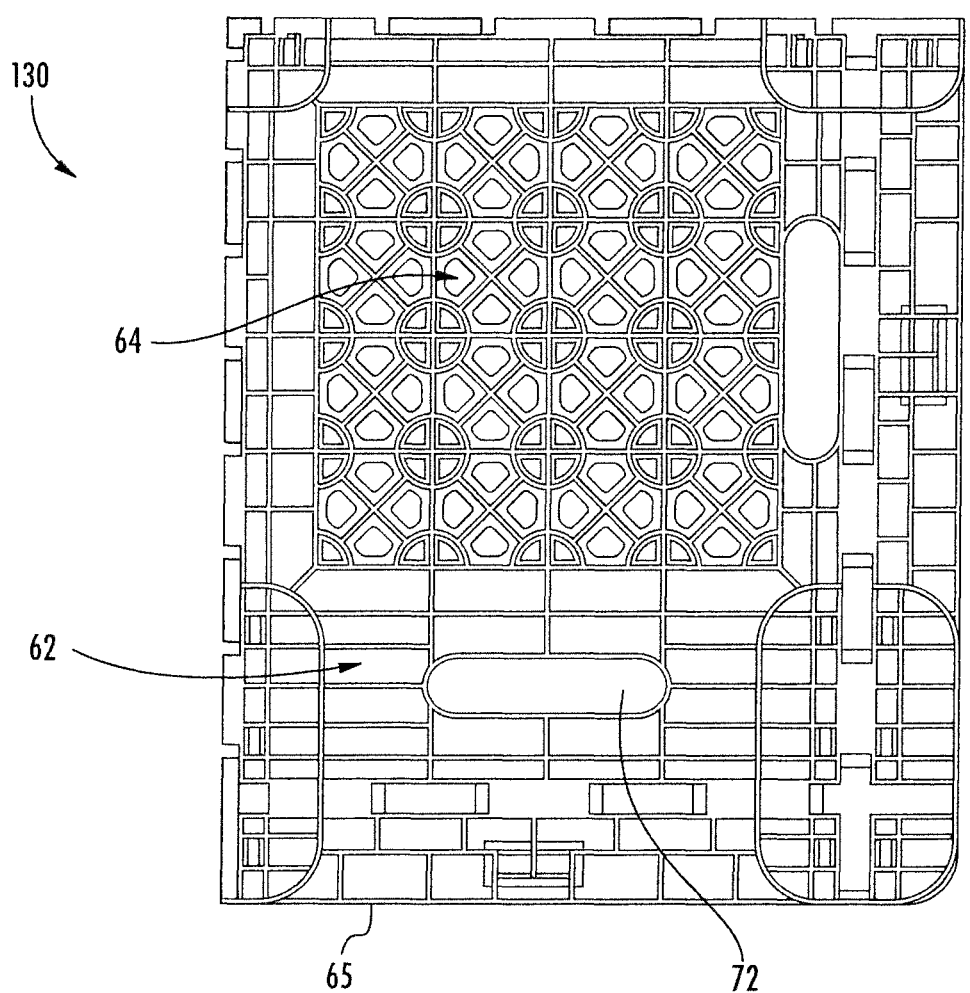
FIG. 10 is a bottom view of the single quadrant shown in FIG. 9.

As noted above, the illustrated top deck 60 is configured with four symmetrical quadrants 130, with an underside of one of the quadrants 130 illustrated in FIGS. 9 and 10 at different angles. Each quadrant 130 includes at least one deck scoop area. In the illustrated embodiment, each quadrant 130 includes a pair of deck scoop areas 62, 64. The pair of deck scoop areas 62, 64 may also be referred to as carvings 62, 64. The deck scoop areas 62, 64 respectively reduce the thickness of the top deck 60 within each quadrant 130.

Deck scoop area 62 may be referred to as a first deck scoop area, and deck scoop area 64 may be referred to as a second deck scoop area. The second deck scoop area 64 may be larger in size than the first deck scoop area 62. In other embodiments, the deck scoop areas 62, 64 may be equal in size. The first deck scoop area 62 may have an elliptical shape, and the second deck scoop area 64 may have a circular or oval shape. In other embodiments, the first and second deck scoop areas 62, 64 may have the same shape.

The underside 63 of the top deck 60 is made up of ribs that are exposed. The first deck scoop area 62 includes a hand grip opening 72 having a rectangular shape. The hand grip opening 72 is centered within the first deck scoop area 62. The hand grip opening 72 is at a peak of the curvature within the first deck scoop area 62. This peak corresponds to the minimum thickness point of the top deck 60 within the first deck scoop area 62.

The hand grip opening 72 includes a wall 74 that extends from an upper surface 61 of the top deck 60 to an underside 63 of the ribs 76, 78 within the first deck scoop area 62. Ribs 76 extend in a first direction, and ribs 78 extend in a second direction orthogonal to the first direction.

The first deck scoop area 62 in each quadrant 130 is adjacent an outer exposed side 65 of the top deck 60. An outer perimeter area 82 of the quadrant 130 between the outer exposed side 65 and the first deck scoop area 62 has a uniform thickness, and is not part of the first deck scoop area 62. The outer perimeter area 82 of the quadrant 130 extends around a perimeter of the top deck 60 for all four quadrants.

The second deck scoop area 64 is separated from the first deck scoop area 64 by an inner portion area 84 of the quadrant. The inner portion area 84 also has a uniform thickness and is not part of the first or second deck scoop area 62, 64.

The second deck scoop area 64 includes a plurality of spaced apart openings 131. The openings 131 may be divided into spaced apart opening sections 132 that are laid out in a grid pattern. Each opening section 132 has a pattern of openings that is symmetrical to each of the other opening sections 132 within the second deck scoop area 64.

The ribs within the second deck scoop area 64 include ribs 86 extending in a first direction and ribs 87 extending in a second direction orthogonal to the first direction. The ribs within the second deck scoop area 64 further include ribs 88 extending between circular shaped ribs 89. The circular shaped ribs 89 are at an intersection of ribs 86, 87. Ribs 88 form a crisscross pattern between adjacent circular shaped ribs 89.

A cross-section view of the quadrant 130 illustrated in FIG. 11 along line AA is provided in FIG. 12. This cross-sectional view shows the first and second deck scoop areas 62, 64 side by side.

Figure 13:
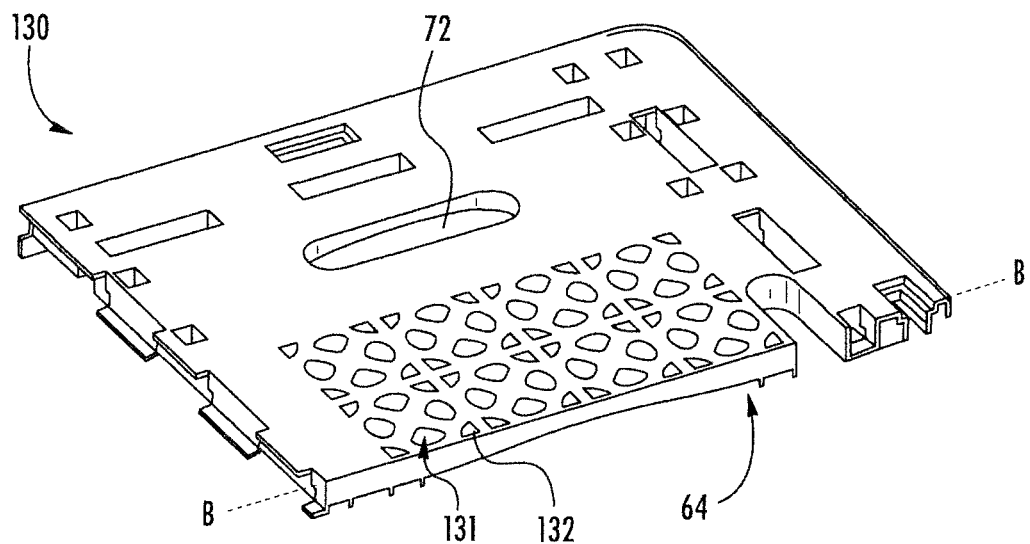
FIGS. 13 and 14 are cross-sectional views of the quadrant shown in FIG. 9 taken along line BB.
Figure 14:
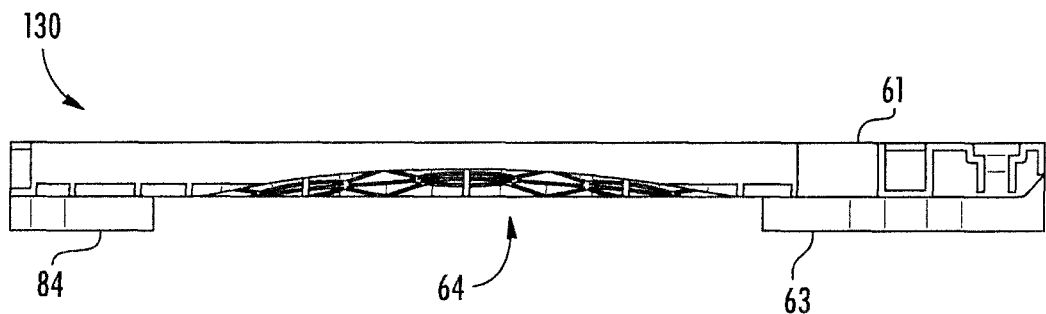

Similarly, a cross-section view of the quadrant 130 illustrated in FIG. 13 along line BB is provided in FIG. 14. This cross-sectional view only shows the second deck scoop area 64 since the first deck scoop area 62 is behind the second deck scoop area 64.

A method making a plastic pallet 50 with at least one deck scoop area 62, 64 includes forming a top deck 60, forming a bottom deck 70, and coupling a plurality of spaced apart support blocks 80, 90 between the top and bottom decks 60, 70 and forming an opening therebetween for receiving a lifting member. As discussed above, the top deck 60 includes at least one deck scoop area 62, 64 on an underside 63 thereof. A thickness of the top deck 60 is reduced in the at least one deck scoop area to reduce influence of top deck deflection on ability of the lifting member to pass through the opening between the top and bottom decks 60, 70.

Referring now to FIGS. 15-18, the use of grommets 120 within the top deck 60 will be discussed. The grommets 120 advantageously provide a better grip when items are placed on an upper surface 61 of the top deck 60, and also provide a better grip with forklift tines on an underside 63 of the top deck 60. Suitable materials for the grommets 120 include natural rubber and synthetic rubber, for example.

The grommets 120 are spaced around the edges of the top deck 60. In the illustrated embodiment, there are 8 grommets 120 spaced adjacent a perimeter of the top deck 60, with each grommet 120 being centered between a pair of adjacent support blocks, such as supports blocks 80, 90. The number, location and size of the grommets 120 may vary as readily appreciated by those skilled in the art. Although not illustrated, grommets 120 may be placed in a central area of the top deck 60, i.e., away from the perimeter of the top deck 60.

Each grommet 120 is inserted into a rectangular shaped grommet opening 124 that extends through the top deck 60. The grommet opening 124 is stepped down from the upper surface 61 of the top deck 60 to form a recessed shelf 126. The grommet opening 124 has a first perimeter size above the recessed shelf 126.

Below the recessed shelf 126, the grommet opening 124 has a second perimeter size that is less than the first perimeter size. Included within the second perimeter size is a divider 128. An upper surface of the divider 128 is recessed from the recessed surface 126, and a lower surface of the divider 128 continues to the underside 63 of the top deck 60. The divider 128 requires that a lower portion of each grommet 120 have a slit so as to accommodate the divider 128, as illustrated in FIG. 17A.

Each grommet 120 includes a lip 133 for engaging the recessed shelf 126. An upper surface 135 of each grommet 120 is flat and elevated above the upper surface 61 of the top deck 60. The transition 137 between the upper surface 135 and the lip 133 of each corresponding grommet 120 is curved.

While an upper half of each grommet 120 is solid, a corresponding lower half is divided into sections 302. The sections 302 are on adjacent sides of the divider 128. A bottom surface of each section 302, which extends through to the underside 63 of the top deck 60, is flared 306 for engaging the underside 63 of the top deck 60.

Figure 15:
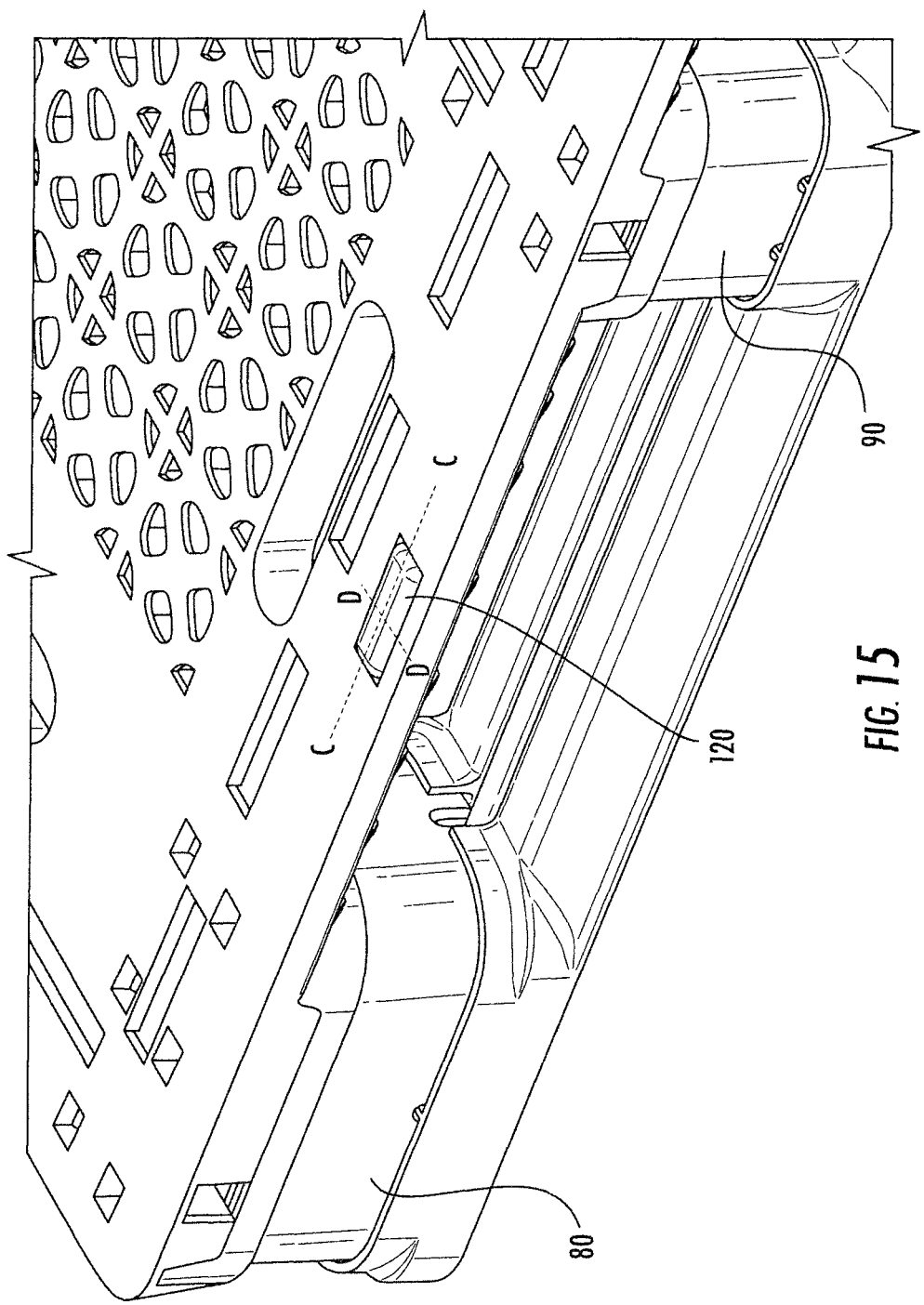
FIG. 15 is a partial upper perspective view of the top deck with a grommet in place in accordance with the disclosure.
Figure 16:
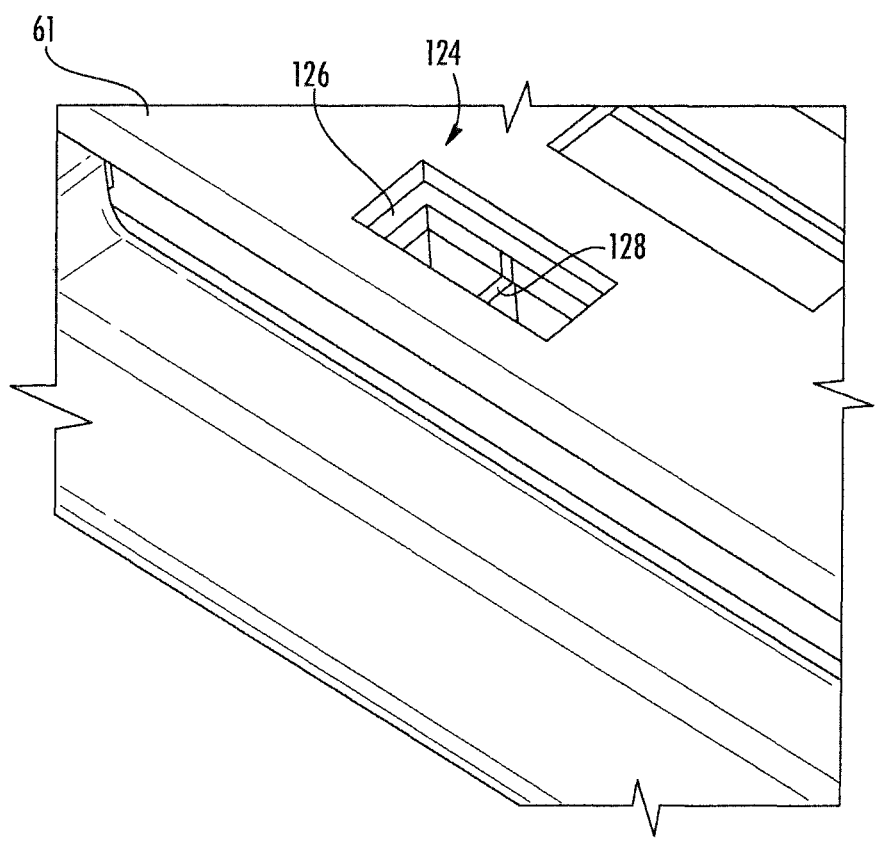
FIG. 16 is a partial upper perspective view of the top deck shown in FIG. 15 with the grommet removed.
Figure 17A:
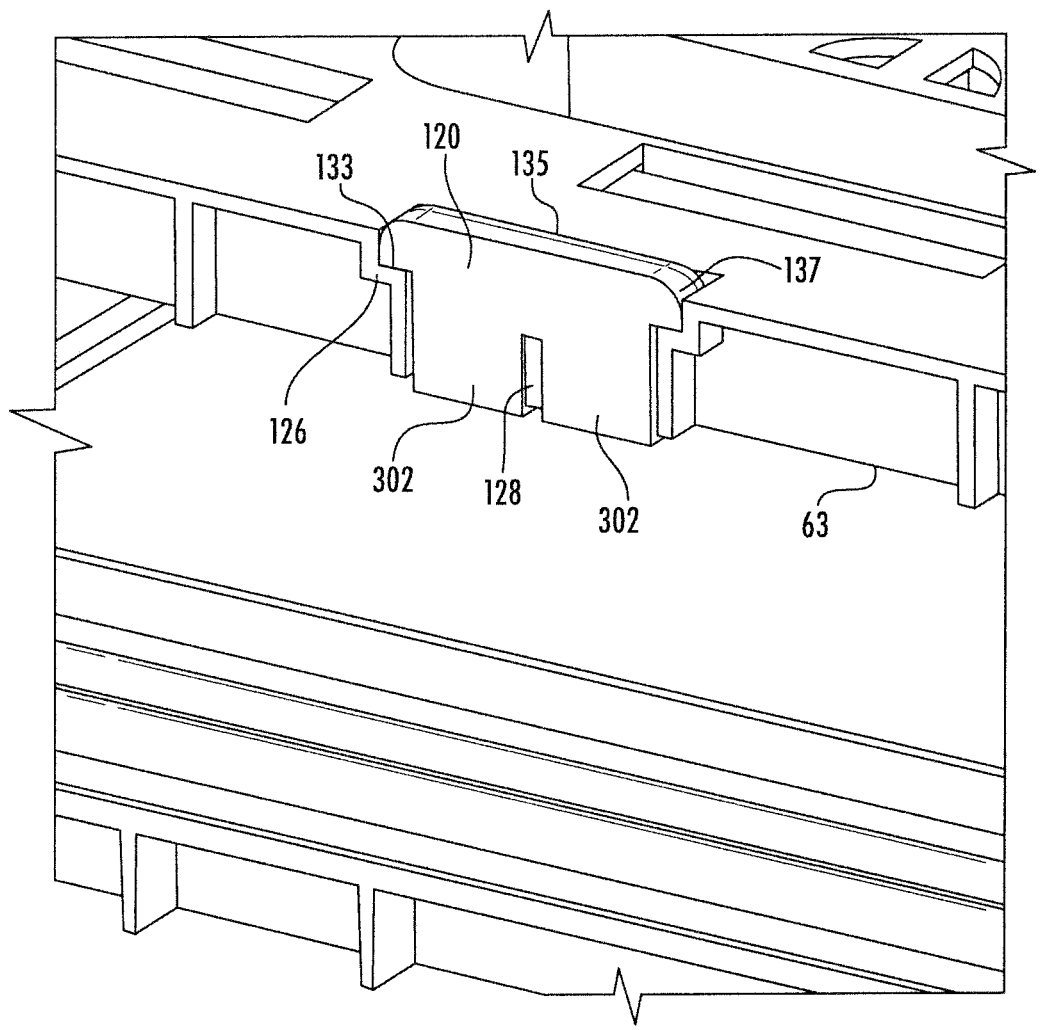
FIG. 17A is a cross-sectional view of the top deck shown in FIG. 15 taken along line CC.
Figure 17B:
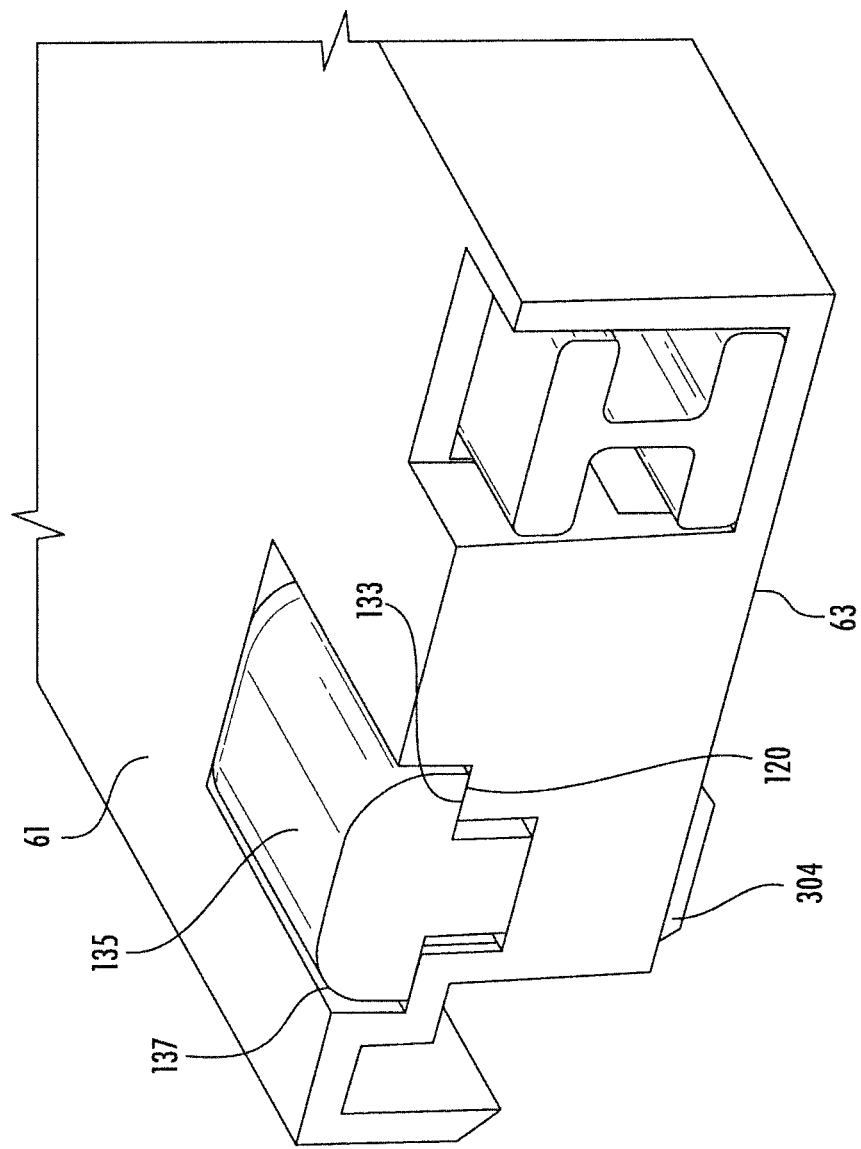
FIG. 17B is a cross-sectional view of the top deck shown in FIG. 15 taken along line DD.
Figure 18A:
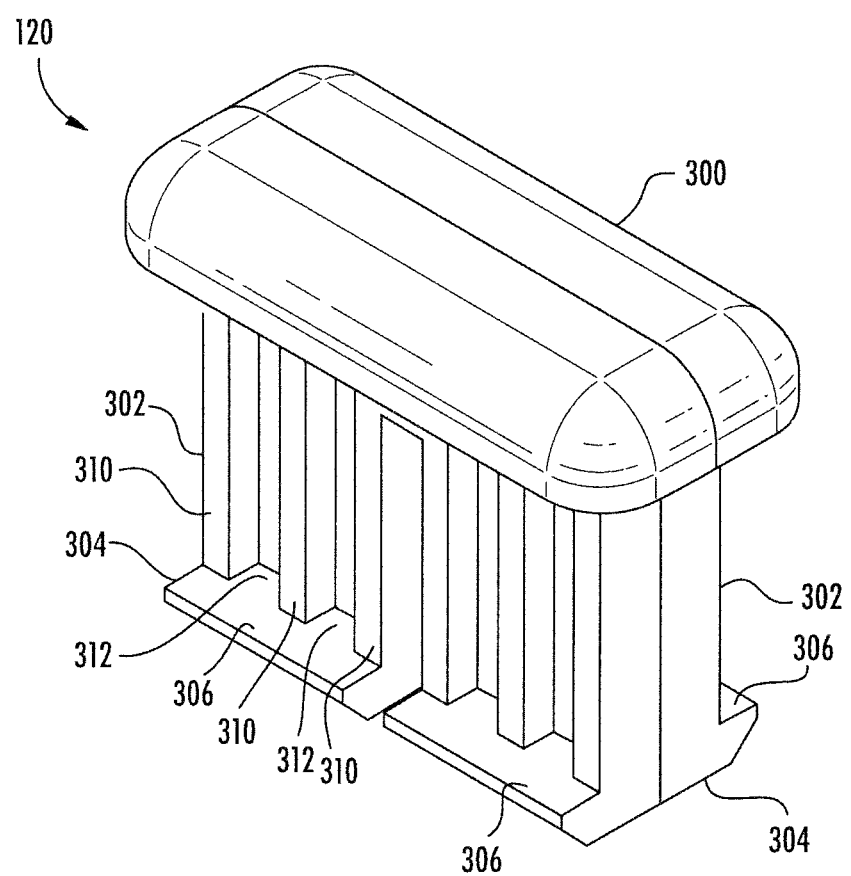
FIGS. 18A-18E are various views of the grommet shown in FIG. 15.
Figure 18B:
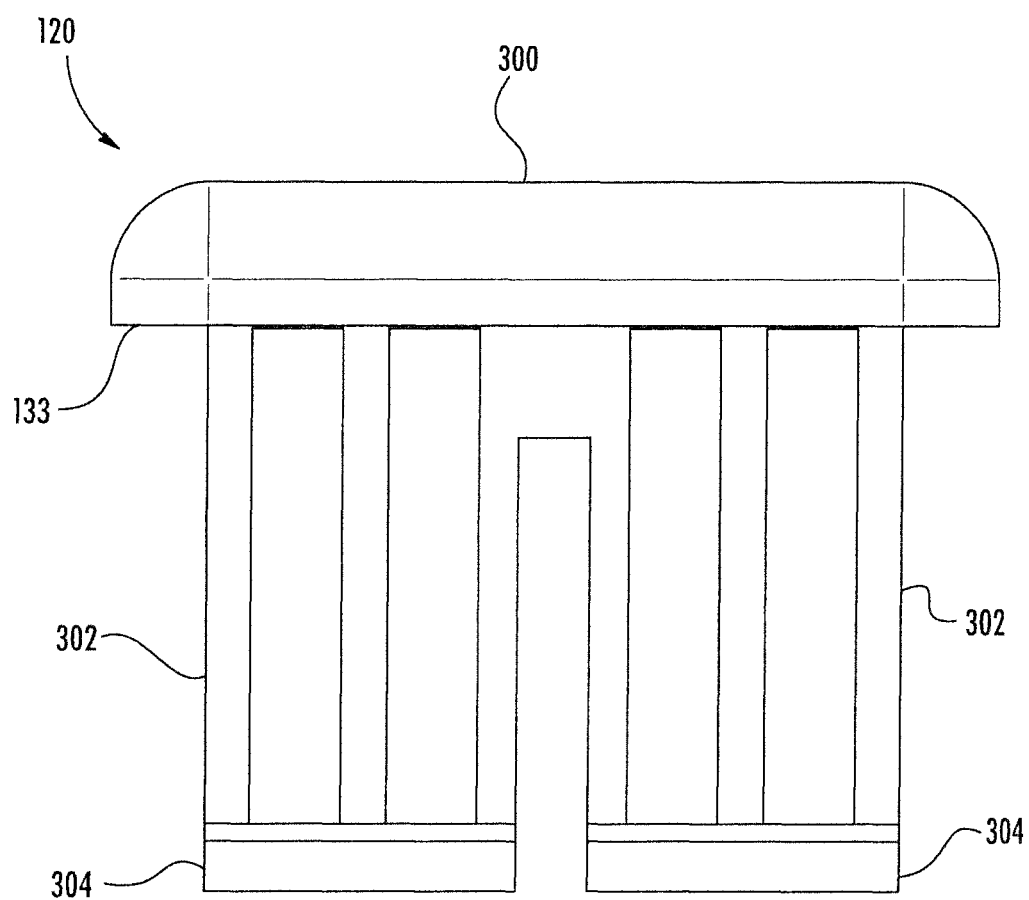
Figure 18C:
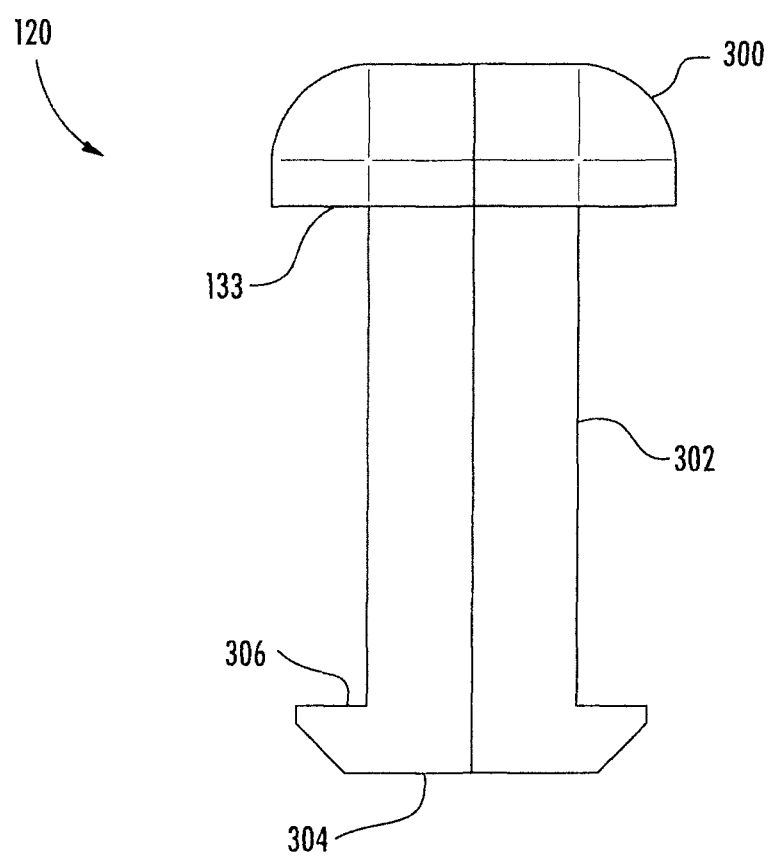
Figure 18D:
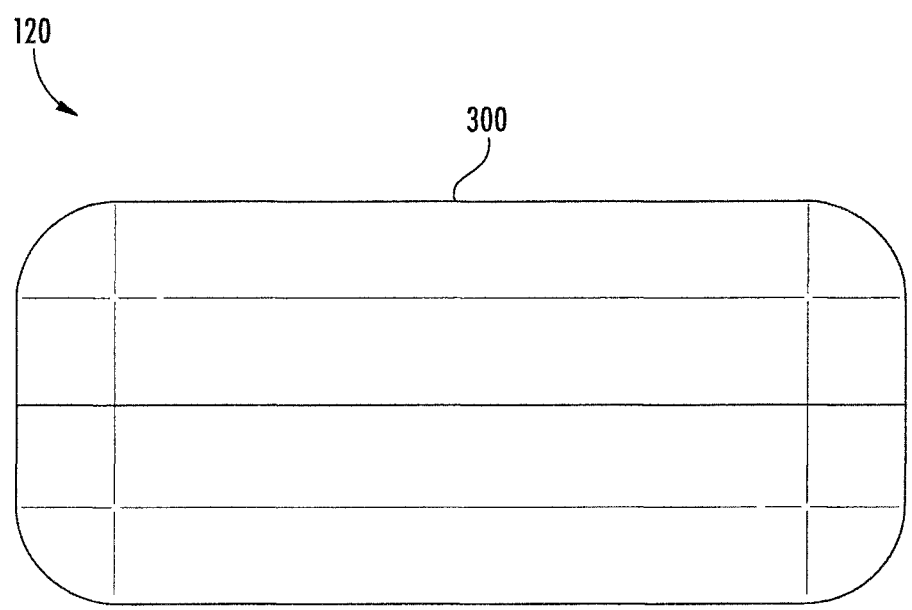
Figure 18E:
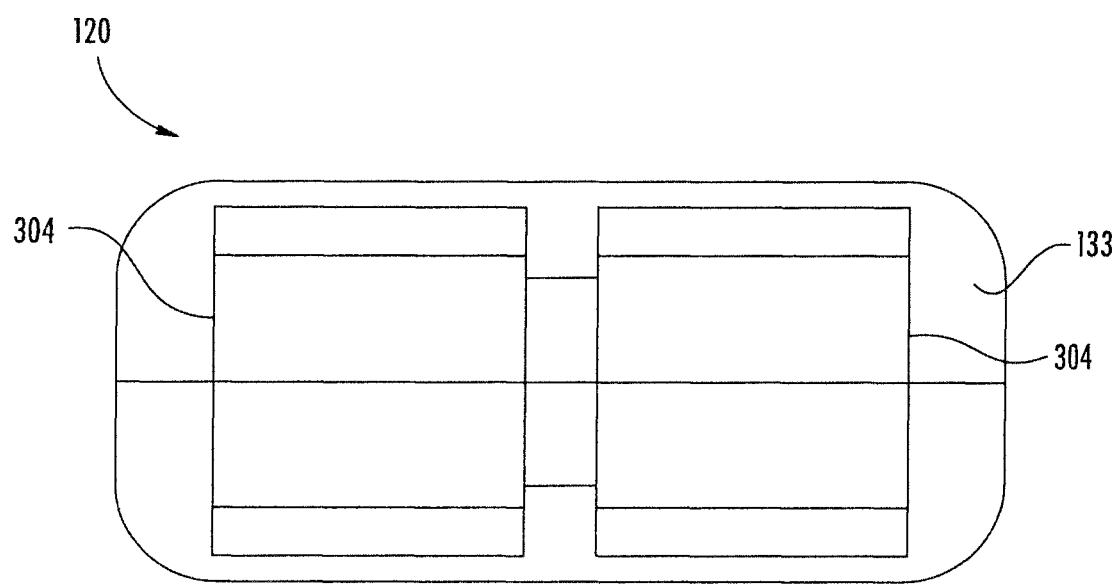

The cross-sectional view of the grommet 120 provided in FIG. 17A is taken along lines CC in FIG. 15. The cross-sectional view of the grommet 120 provided in FIG. 17B is taken along lines DD in FIG. 15.

Referring now FIGS. 18A-18E, a grommet 120 will be discussed in greater detail. Each grommet 120 includes an upper section 300, at least one mid-section 302, and at least one lower section 304. The grommet 120 may be formed as a single monolithic unit from natural rubber or synthetic rubber. The grommet 120 is rectangular shaped to match the rectangular-shaped grommet opening 124. In other embodiments, the grommet 120 and the grommet opening 124 may have a different shape, such as square or circular, for example.

The upper section 300 includes a lower lip 133 that is to rest on the recessed shelf 126, and an outer exposed surface of the upper section 300 is to extend in height the top deck 60. The outer exposed surface is to provide a better grip when items are placed on an upper surface 61 of the top deck 60. The at least one mid-section 302 is adjacent the lower lip 133 and extends from the upper section 300 to an underside 63 of the top deck 60.

The at least one lower section 304 extends from the at least one mid-section 302, and includes a pair of spaced apart lips 306 to rest on the underside 63 of the top deck 60. An outer exposed surface of the at least one lower section 304 extends in height below the underside 63 of the top deck 60. The outer exposed surface is to provide a better grip when forklift tines make contact with an underside 63 of the top deck 60.

As noted above, each grommet opening 124 in the top deck 60 includes a divider 128. The divider 128 includes a lower surface even with the underside 63 of the top deck 60, and an upper surface that is below the recessed shelf 126. In other embodiments, the lower surface of the divider 128 may not be even with the underside 63 of the top deck 60, and the upper surface of the divider 128 may be even with the recessed shelf 126.

To accommodate for the divider 128, the at least one mid-section 302 comprises a pair of spaced apart mid-sections 302, with each mid-section 302 being separated by the divider 128. Similarly, the at least one lower section 304 comprises a pair of lower sections 304, with each lower section 304 extending from a respective mid-section 302.

Sidewalls of the illustrated mid-sections 302 have a square waveform shape formed by spaced apart vertical section protrusions 310 with recesses 312 therebetween. In other embodiments, sidewalls of the mid-sections 302 may have completely flat surfaces.

Figure 19:
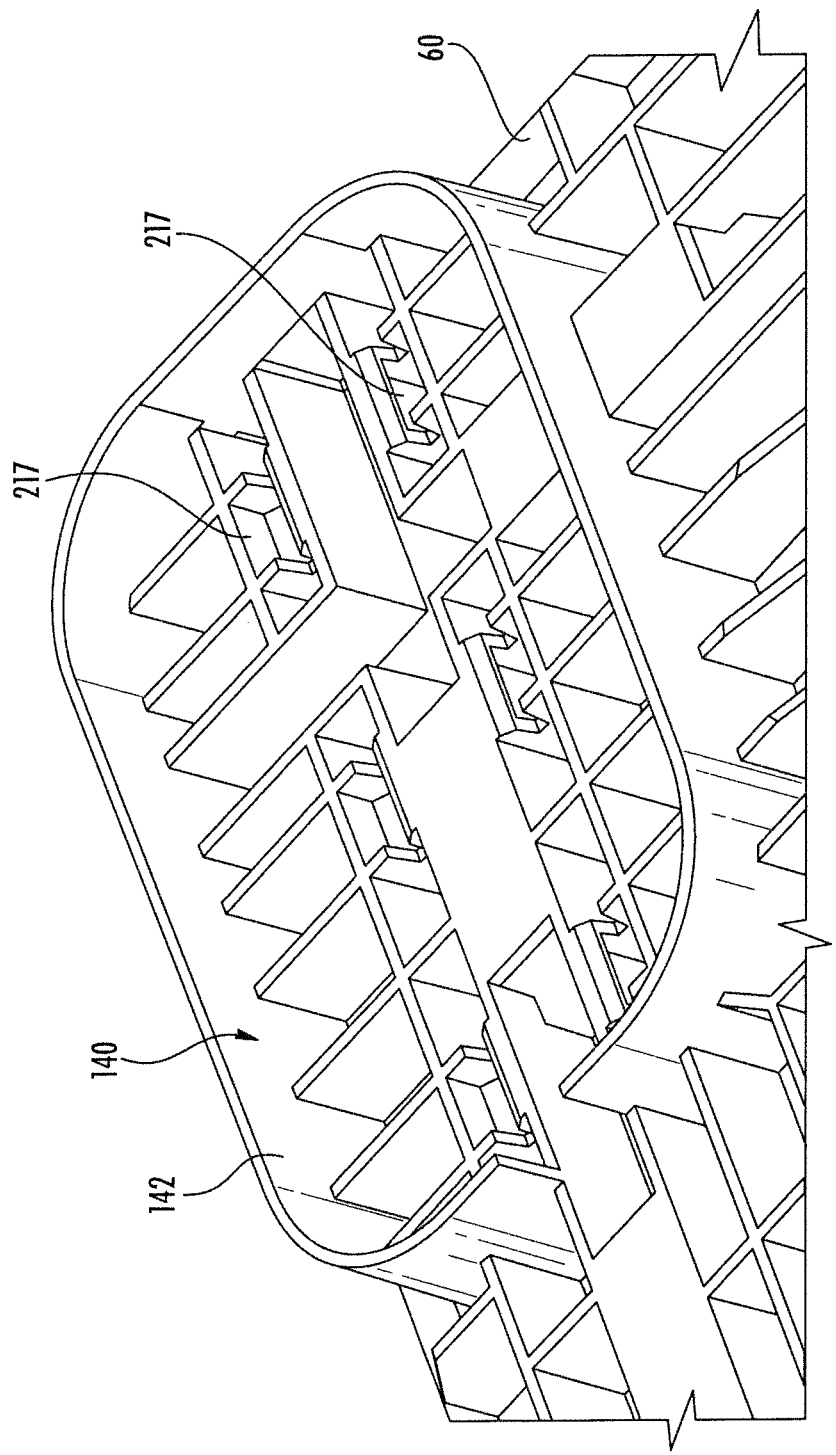
FIG. 19 is a partial perspective view of an underside of the top deck shown in FIG. 1 with a support block recess having a retaining wall.

Referring now to FIG. 19, the top deck 60 is configured to include recesses 140 for the support blocks 80, 90. The recesses 140 are respectively sized to receive the upper end of the support blocks 80, 90. The recesses 140 form a recessed pocket providing a retaining wall 142 to laterally support the upper end of the support blocks 80, 90. The retaining wall 142 may also be referred to as a retaining rib.

Figure 20:
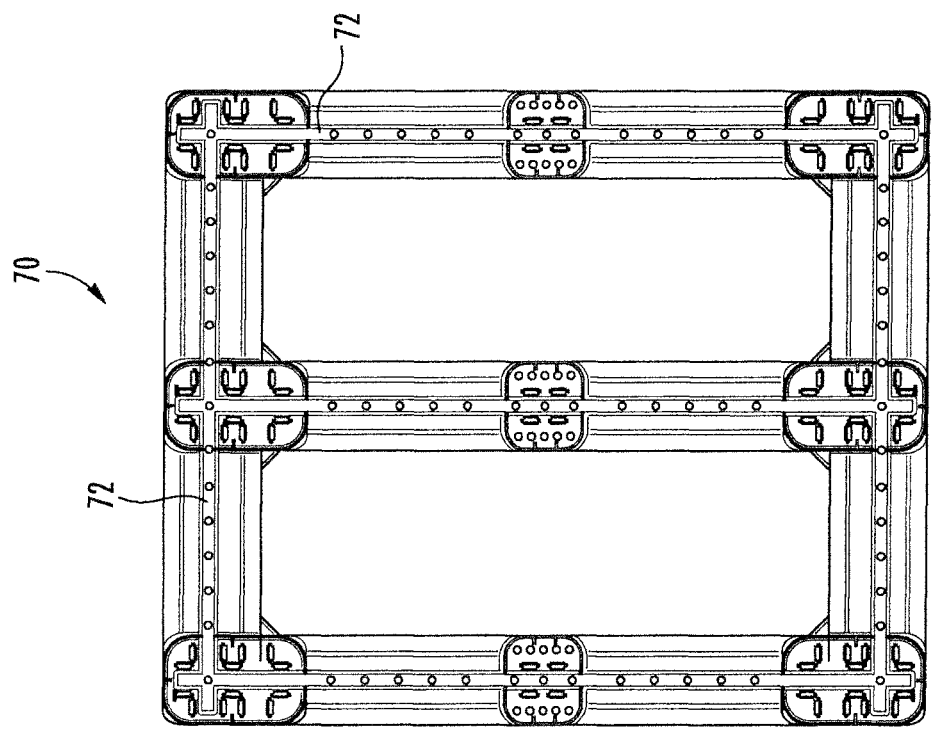
FIGS. 20 and 21 are top and bottom views of the bottom deck shown in FIG. 1.
Figure 21:
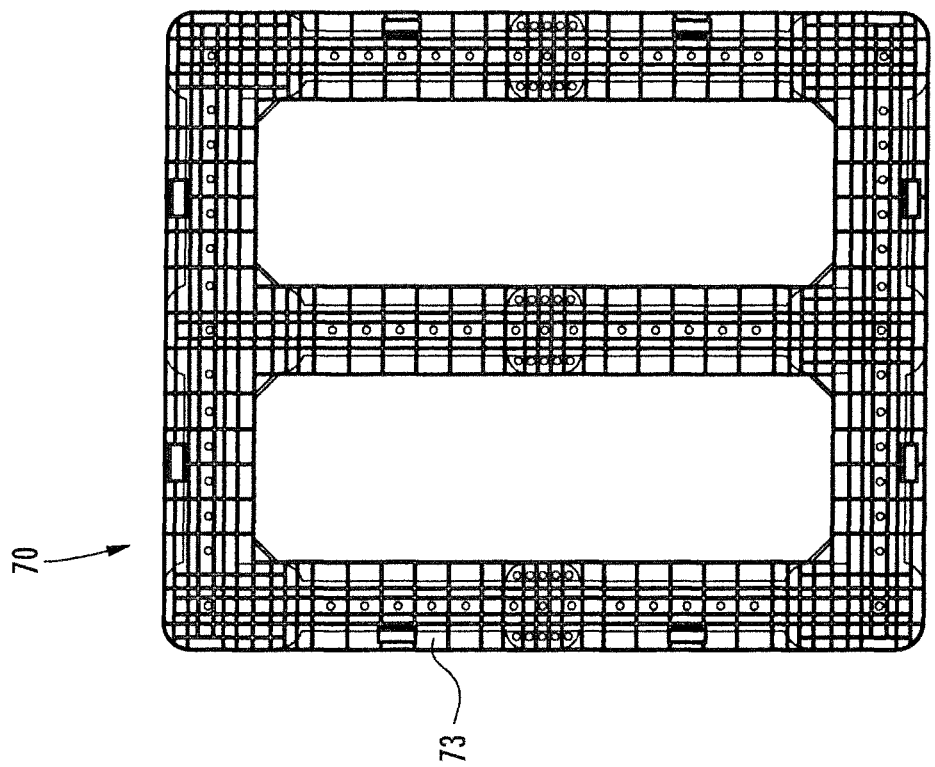
Figure 22:
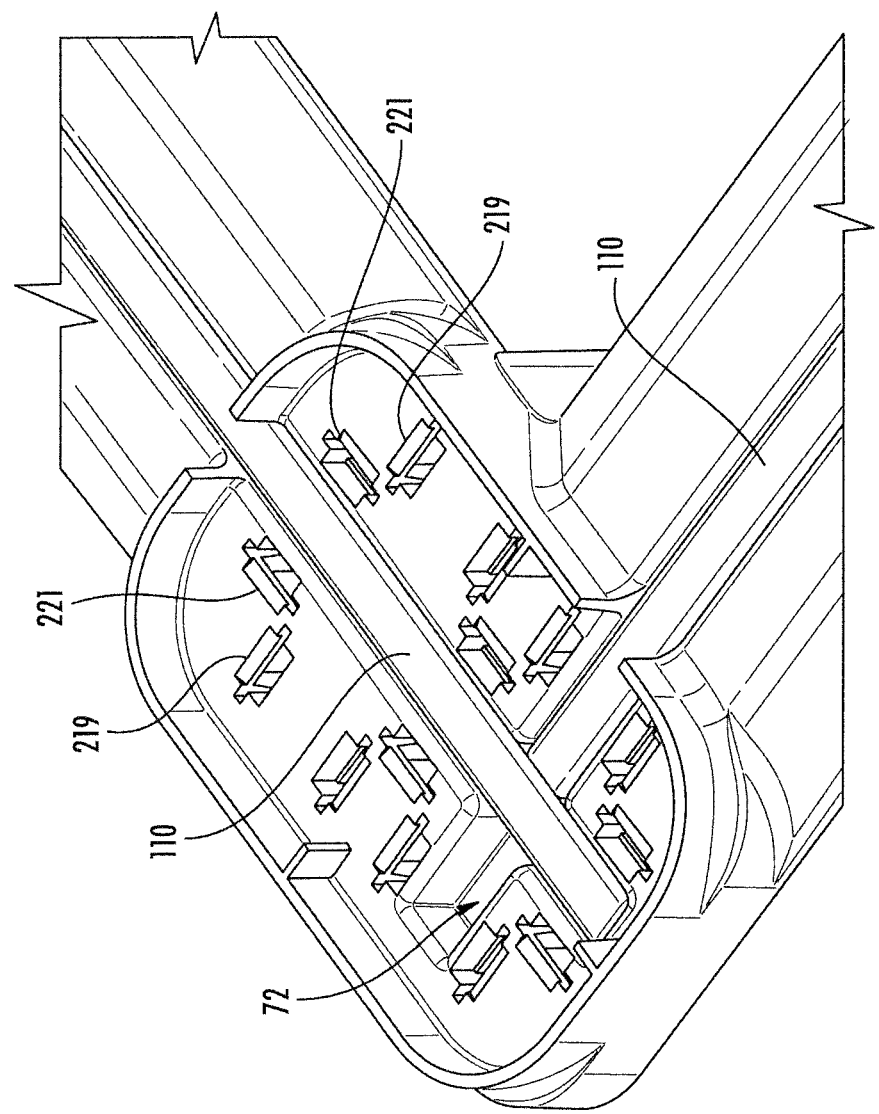
FIG. 22 is a partial perspective view of the bottom deck shown in FIG. 1 with the support structure positioned within the open channels.

The bottom deck 70 will now be discussed in greater detail. A top view of the bottom deck 70 is illustrated in FIG. 20, and a bottom view of the bottom deck 70 is illustrated in FIG. 21. The bottom deck 70 includes a support structure 110, as illustrated in FIG. 22.

The support structure 110 is formed as a single monolithic unit as shown in the exploded view of the plastic pallet 50 illustrated in FIG. 3. The support structure 110 is dropped into open channels 72 within the bottom deck 70 during assembly of the plastic pallet 50, as illustrated in FIG. 22. Alternatively, the support structure 100 may be formed as individual support structure members that are dropped into the open channels 72 within the bottom deck 70 during assembly of the plastic pallet 50.

The support structure 110 has a square shape with an opening extending therethrough. The support blocks 80, 90 make contact with the support structure 110 when the plastic pallet 50 is assembled. The support structure 110 is not limited to a square shape. The support structure 110 may be formed having other shapes.

Figure 23:
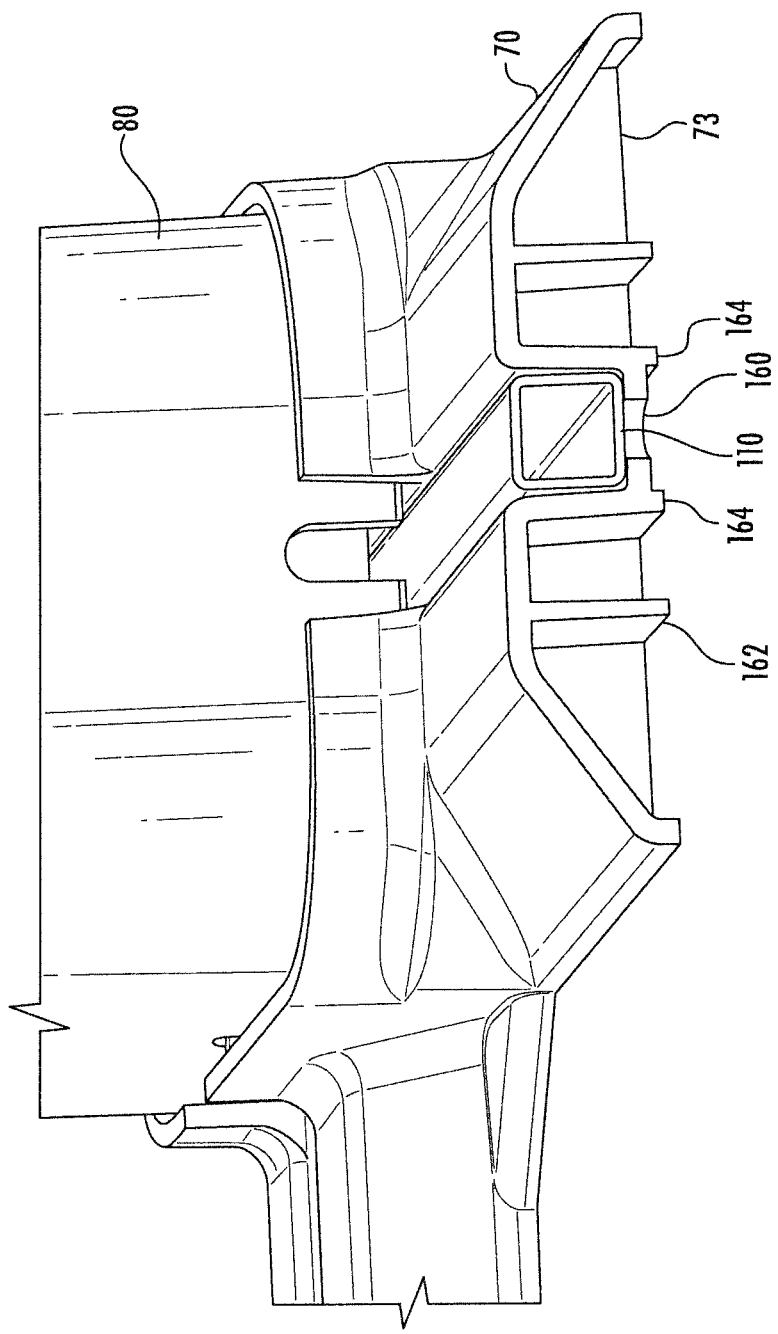
FIG. 23 is a cross-sectional perspective view of the bottom deck shown in FIG. 1 with a raised channel floor for the support structure.

A cross-sectional view of the bottom deck 70 and support structure 110 is provided in FIG. 23 to illustrate a raised channel floor 160 for the support structure 110. The raised channel floor 160 helps to protect the support structure 110 from being exposed should the underside 73 of the bottom deck 70 wear thin from use. The bottom or floor 160 of the channel 72 is raised from the lowermost surface 162 of the bottom deck 70. Legs 164 are positioned under the channel floor 160. The lowermost surface 162 and the legs 164 correspond to the underside of the bottom deck 70.

Figure 24:
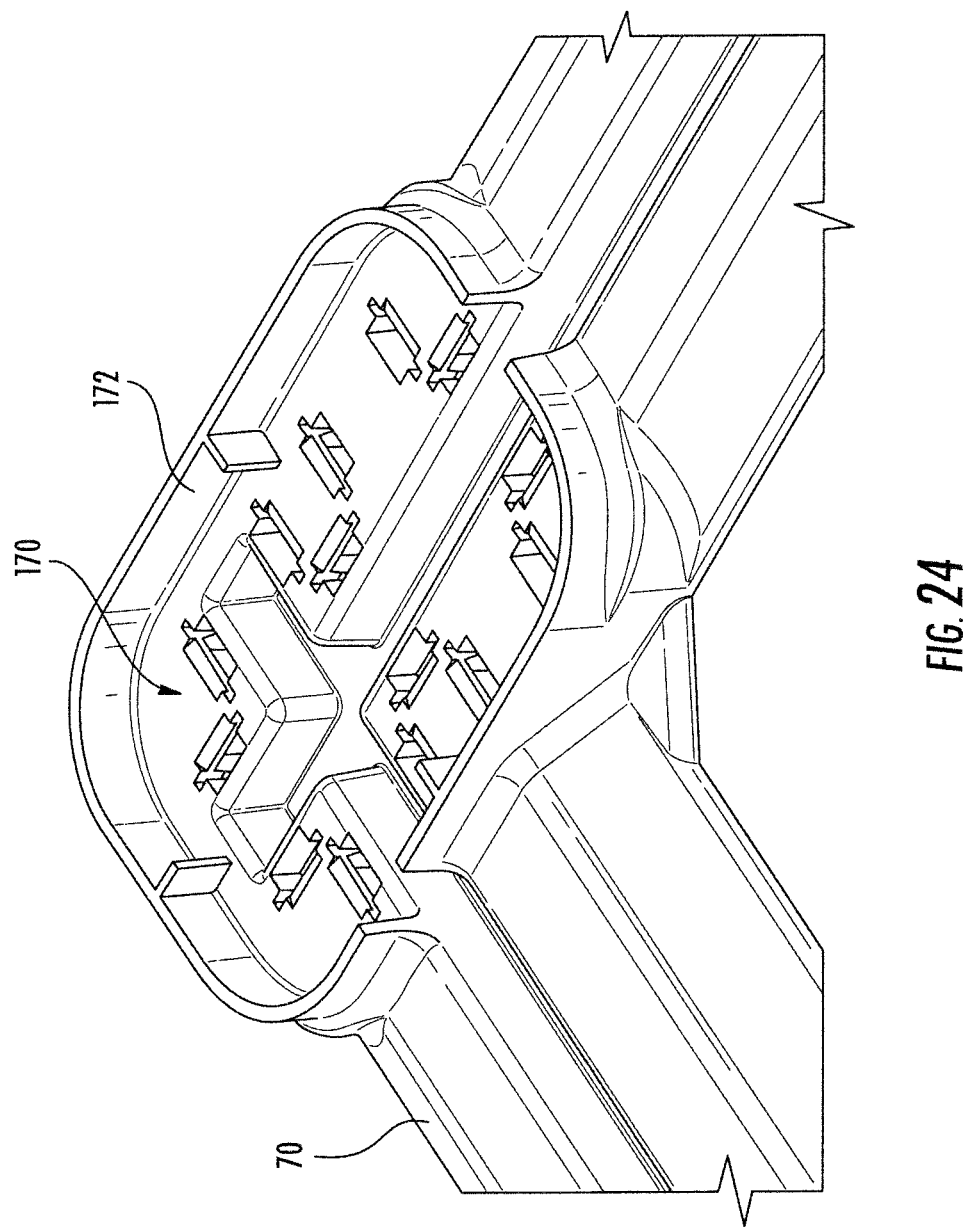
FIG. 24 is a partial perspective view of a top side of the bottom deck shown in FIG. 1 with a support block recess having a retaining wall.

Referring now to FIG. 24, the bottom deck 70 is configured to include recesses 170 for the support blocks 80, 90. The recesses 170 are respectively sized to receive the lower end of the support blocks 80, 90.

The recesses 170 form a recessed pocket providing a retaining wall 172 to laterally support the lower end of the support blocks 80, 90. The retaining wall 172 may also be referred to as a retaining rib.

Referring now to FIGS. 25-32, the large support blocks 80 will be discussed in greater detail. The large support blocks 80 advantageously include upper snaps 200, 201 for engaging the top deck 60 and lower snaps 202, 203, 204, 205 for engaging the bottom deck 70. The upper and lower snaps 200-205 may also be referred to as upper and lower tabs 200-205.

Should any one of the support blocks 80 become damaged, the top and bottom decks 60, 70 may be separated from the support blocks 80, 90 via their corresponding upper and lower tabs 200-205 so that the damaged support block 80 may be replaced.

The top deck 60 has spaced apart upper and lower surfaces 61, 63. The lower surface 63 has a plurality of top deck tab openings 217, as shown in FIG. 19. Each large support block 80 includes an inner wall 210 having a rectangular shape surrounding an interior opening 220, and an outer wall 212 having a rectangular shape surrounding the inner wall 210. The outer wall 212 has an upper surface coplanar with an upper surface of the inner wall 210, and a lower surface coplanar with a lower surface of the inner wall 210.

Ribs 214 extend between the inner and outer walls 210, 212. The ribs 214 have an upper surface coplanar with an upper surface of the inner and outer walls 210, 212, and a lower surface coplanar with a lower surface of the inner and outer walls 210, 212.

Figure 28:
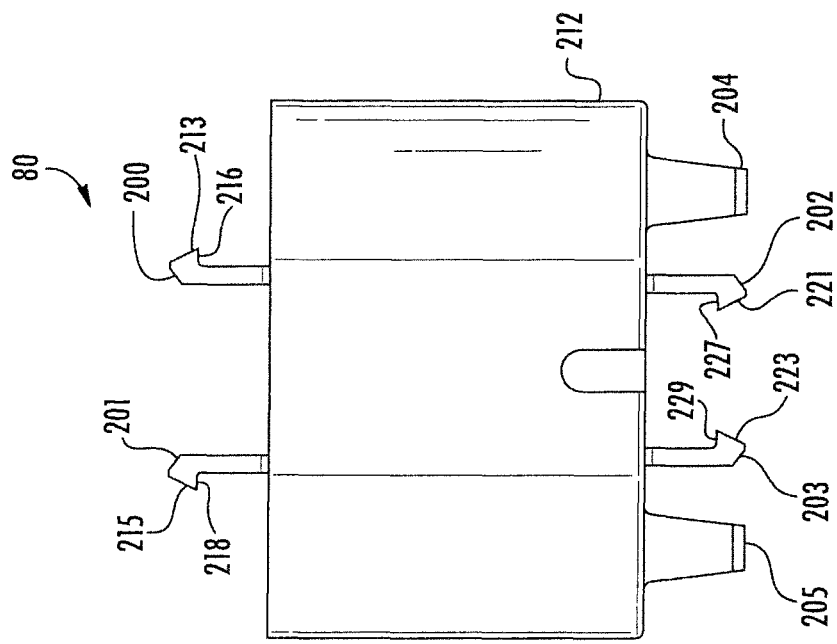
FIGS. 27 and 28 are side and end views of the large support block illustrated in FIG. 25.
Figure 27:
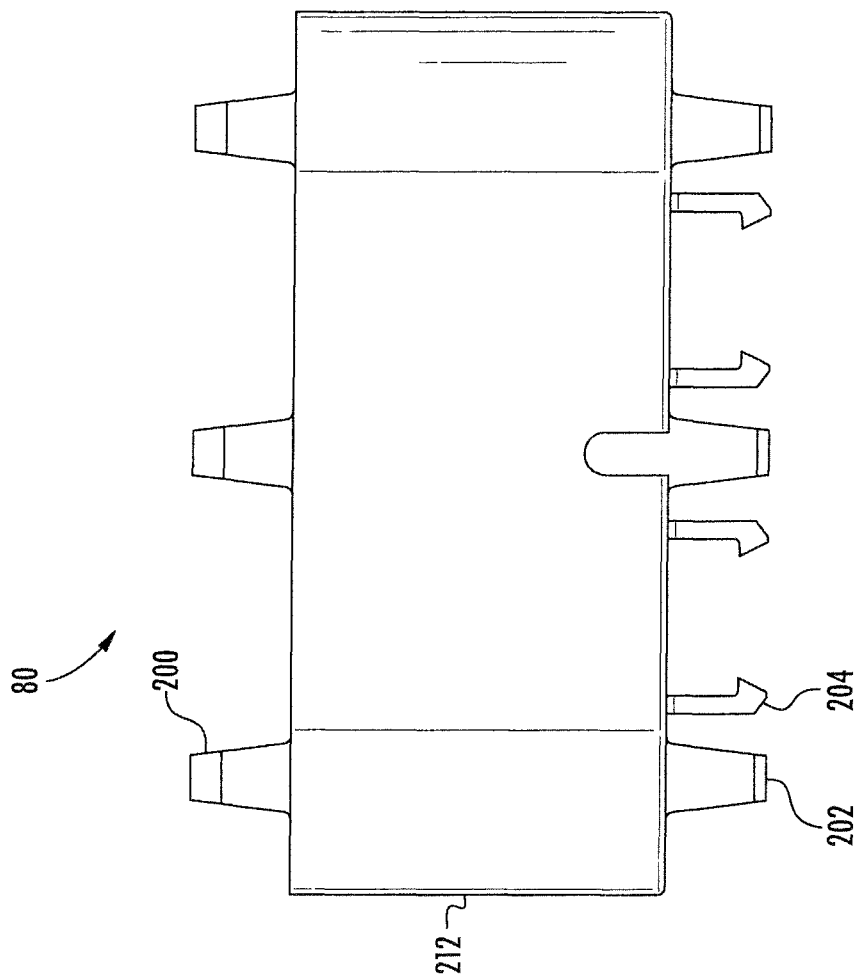
Figure 29:
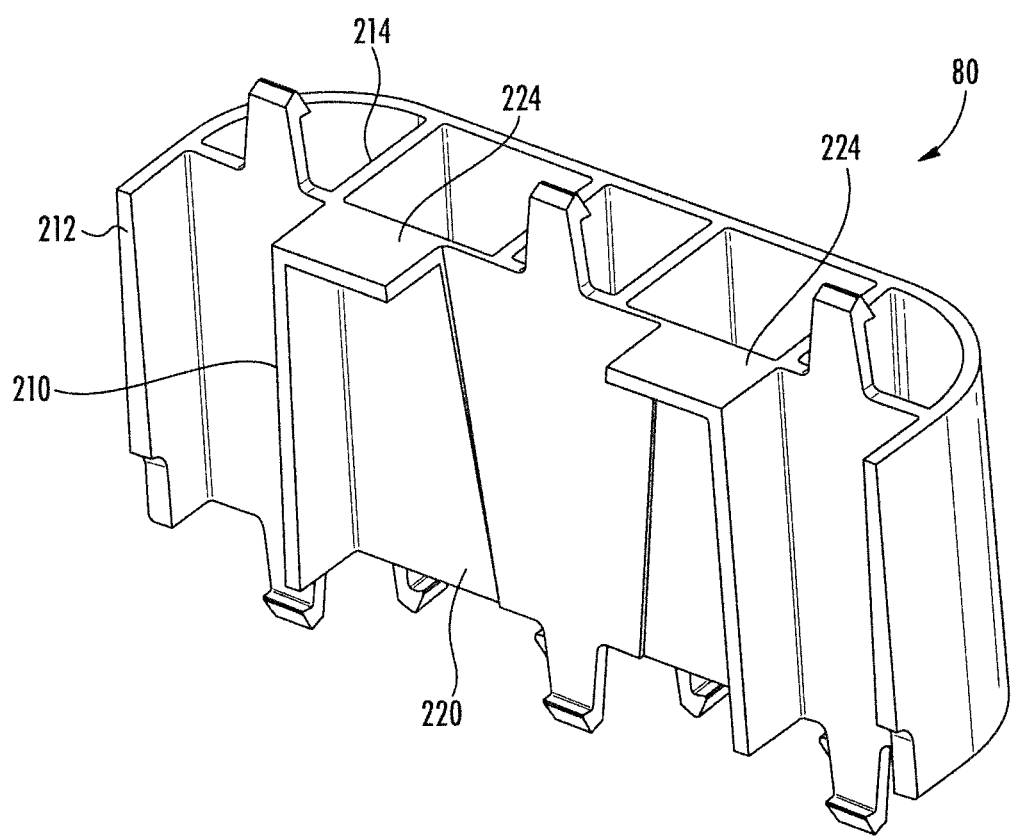
FIG. 29 is a cross-sectional perspective view of the large support block illustrated in FIG. 25.

A first plurality of upper tabs 200 extend outwards from the upper surfaces of the inner wall 210 and the ribs 214. Each tab 200 includes an angled contact surface 213 for engaging the top deck tab openings 217 as shown in FIG. 28.

A second plurality of upper tabs 201 extend outwards from the upper surfaces of the inner wall 210 and the ribs 214. Each tab 201 includes an angled contact surface 215 for engaging the top deck tab openings 217 as also shown in FIG. 28. The angled contact surfaces 213, 215 of the first and second upper tabs 200, 201 face away from each other.

The first upper tabs 200 are aligned with the second upper tabs 201. That is, the upper tabs 200, 201 are grouped together in pairs and face outwards.

Figure 31:
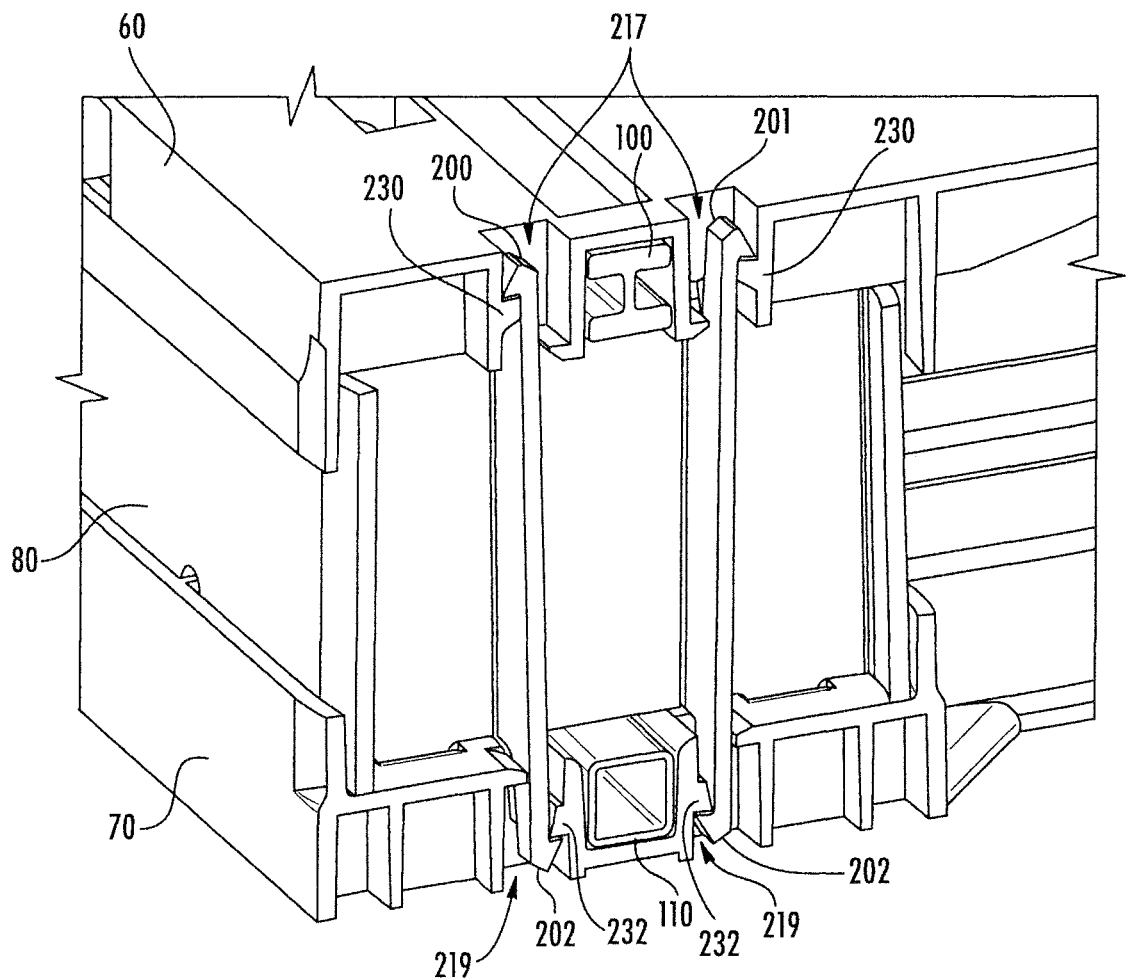
Figure 34:
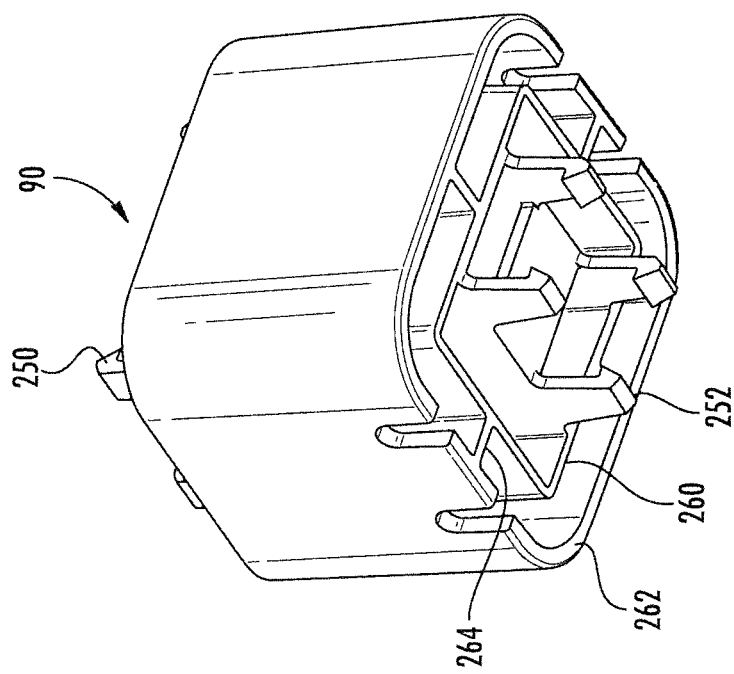
FIGS. 33 and 34 are upper and lower perspective views of one of the small support blocks illustrated in FIG. 1.
Figure 33:
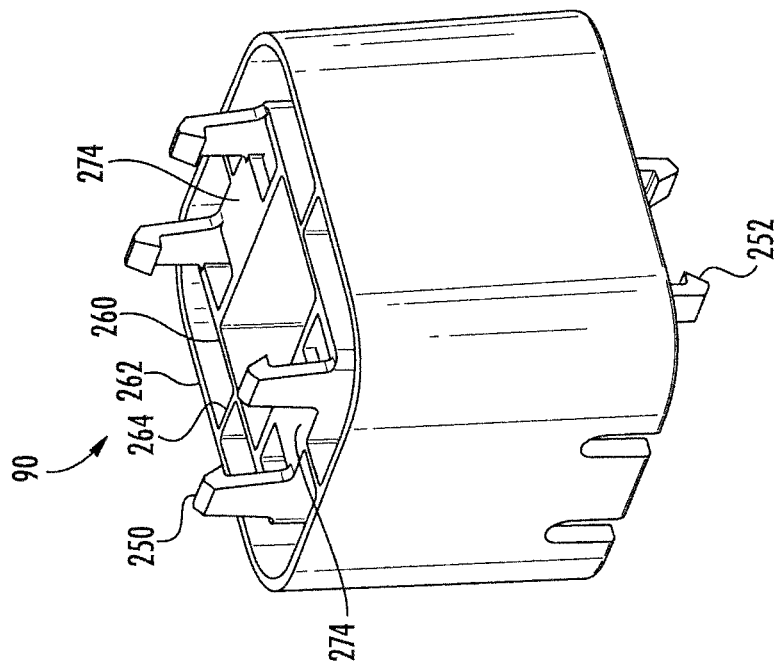
Figure 36:
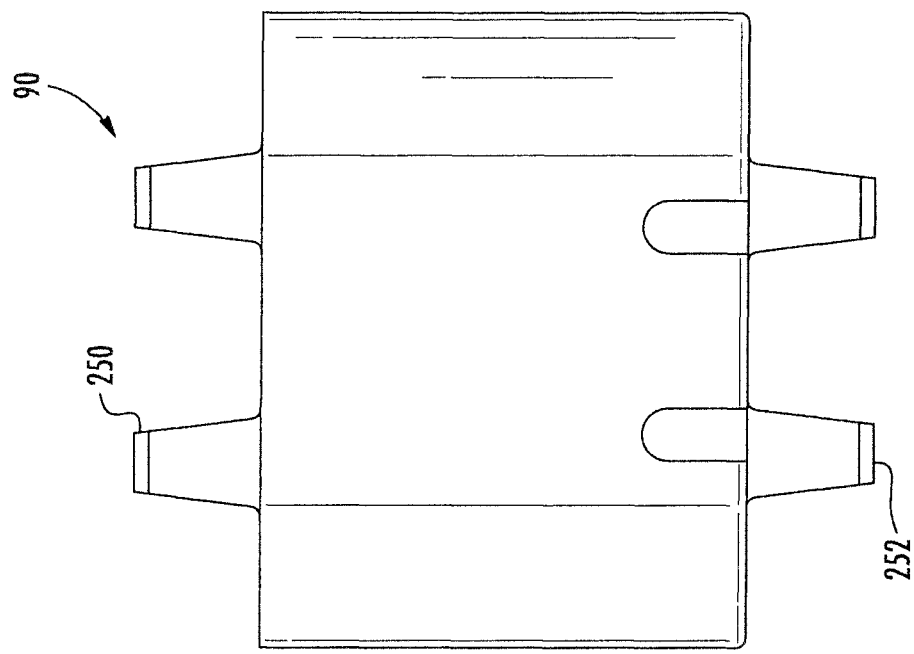
FIGS. 35 and 36 are side and end views of the large support block illustrated in FIG. 33.
Figure 35:
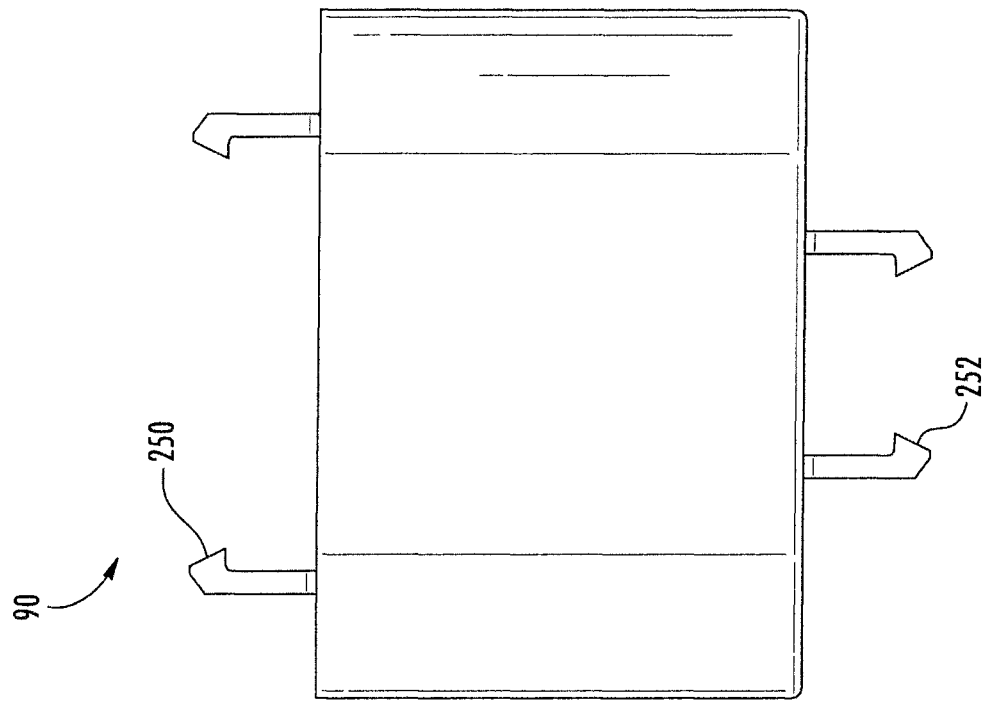
Figure 37:
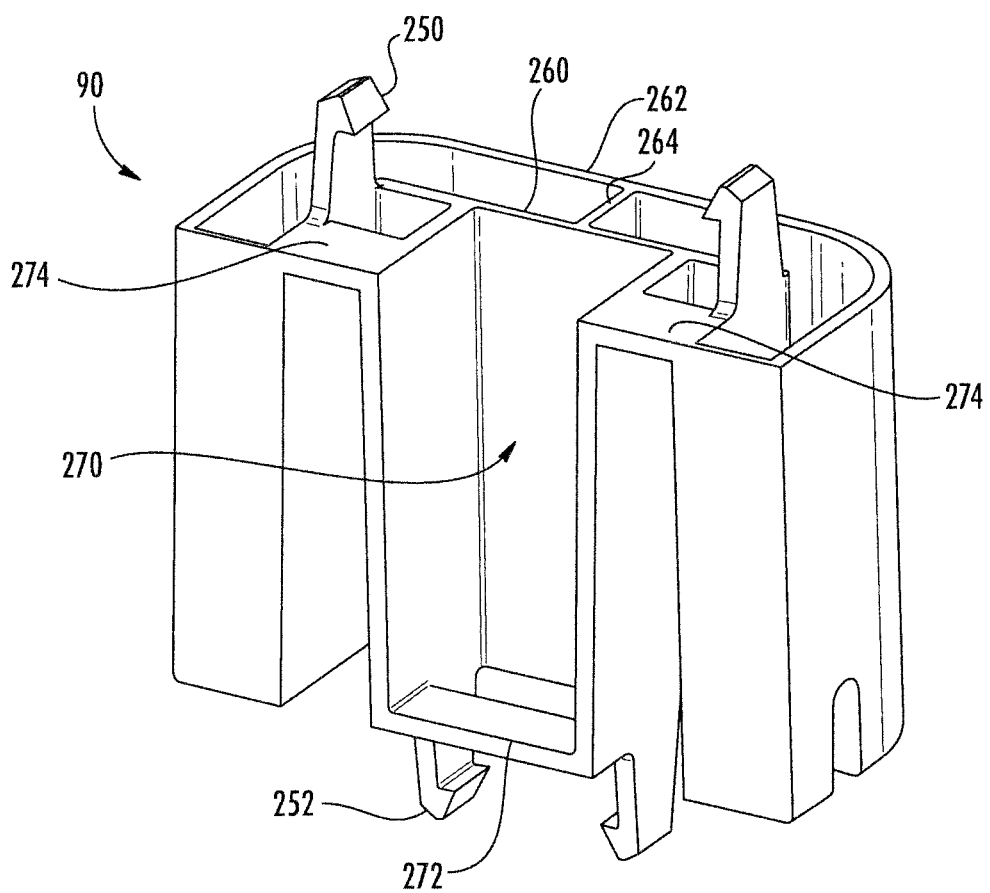
FIG. 37 is a cross-sectional perspective view of the small support block illustrated in FIG. 33.

Each top deck opening 217 includes a flange 230, as illustrated in FIG. 31. Each upper tab 200, 201 comprises a shoulder 216, 218 opposite their respective angled contact surface 213, 215, as illustrated in FIG. 28, for engaging the flange 230 in a respective top deck tab opening 217. The angled contact surface 213, 215 of each upper tab 200, 201 is configured to flexibly contact the flange 230 in the respective top deck tab opening 217 before the shoulder 216, 218 engages the flange 230 when the top deck 60 is coupled to the support blocks 80.

An interior 220 of the support block 80 is open and does not include any ribs. A portion of the interior 220 is closed off via spaced apart cap surfaces 224 on the upper surface of the inner wall 210. The cap surfaces 224 provide additional support for the support block 80. The interior 220 on the lower surface of the support block 80 is open.

Figure 30:
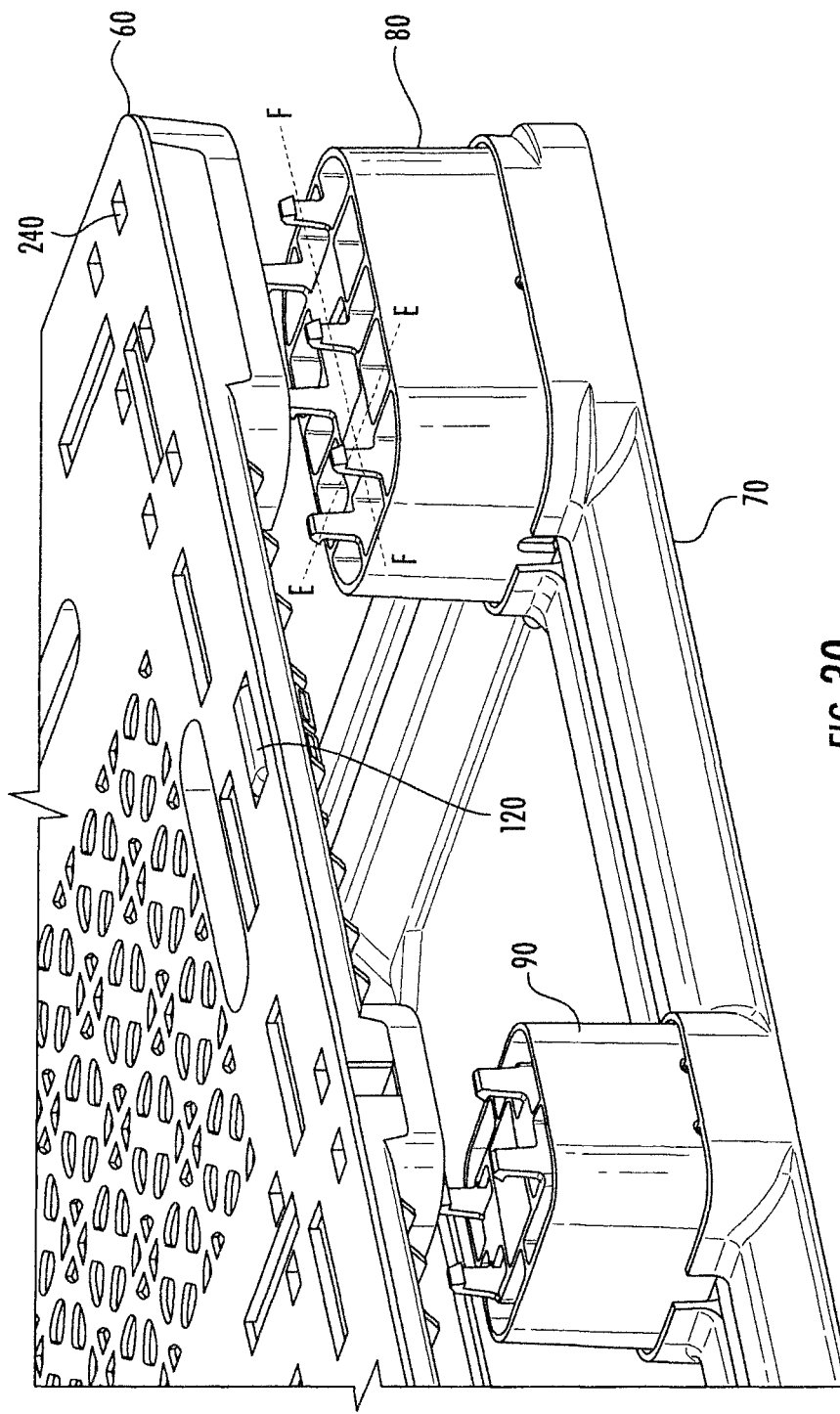
FIG. 30 is a partial perspective view of the top deck illustrated in FIG. 1 separated from the support blocks in the bottom deck.

A partial view of the top deck 60 separated from a large support block 80 and a small support block 90 is illustrated in FIG. 30. The large support block 80 is rectangular shaped and has a short side and a long side. A cross-section view of the large support block 80 along the short side is illustrated in FIG. 31. A cross-section view of the large support block 80 along the long side is illustrated in FIG. 32.

Referring now to FIG. 31, each top deck tab opening 217 is adjacent a support structure member 100 in the top deck 60. Each first and second upper tab 200, 201 is flexible for engaging the flange 230 in the top deck tab opening 217.

The bottom deck 70 has spaced apart upper and lower surfaces 71, 73, as shown in FIGS. 20, 21. The upper surface 71 has a plurality of bottom deck tab openings 219, 221, as shown in FIG. 22. Each bottom deck tab opening 219, 221 is adjacent the support structure 110 in the bottom deck 70.

Each support block 80 further includes a first plurality of lower tabs 202 extending outwards from the lower surfaces of the inner wall 210 and the ribs 214. Each tab 202 includes an angled contact surface 221, as shown in FIG. 28, for engaging the bottom deck tab openings 219.

A second plurality of lower tabs 203 extend outwards from the lower surfaces of the inner wall 210 and the ribs 214. Each tab 203 includes an angled contact surface 223, as also shown in FIG. 23, for engaging the bottom deck tab openings 219. The angled contact surfaces 221, 223 of the first and second lower tabs 202, 203 face towards each other. The first lower tabs 202 are aligned with the second lower tabs 203.

Each bottom deck opening 219 includes a flange 232, as illustrated in FIG. 31. Each lower tab 202, 203 includes a shoulder 227, 229 opposite the angled contact surface 221, 223, as shown in FIG. 28, for engaging the flange 232 in a respective bottom deck tab opening 219.

The angled contact surface 221, 223 of each lower tab 202, 203 is configured to flexibly contact the flange 232 in the respective bottom deck tab opening 219 before the shoulder 227, 229 engages the flange 232 when the bottom deck 70 is coupled to the support blocks 80.

Figure 26:
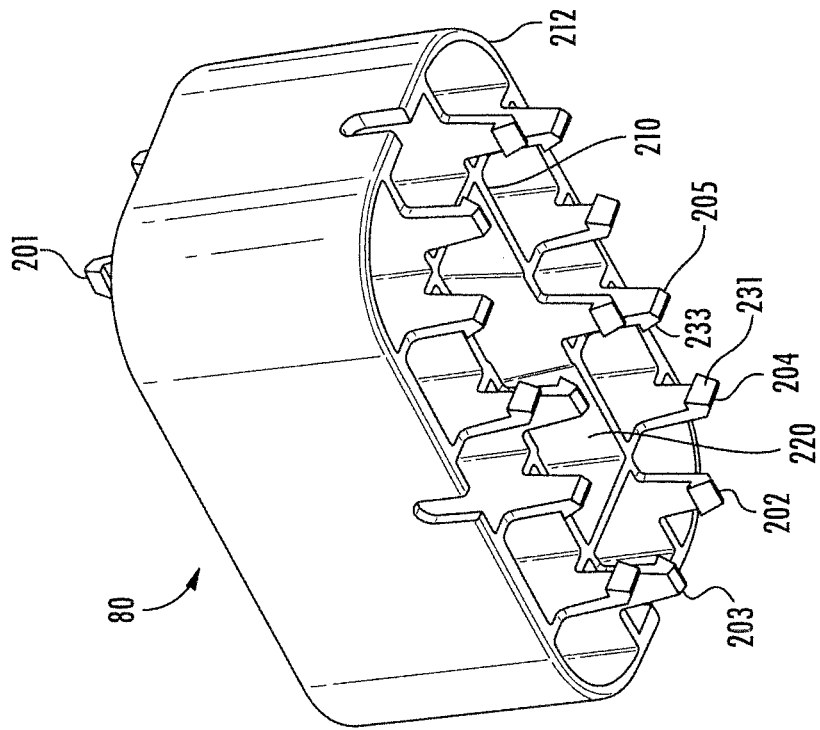
FIGS. 25 and 26 are upper and lower perspective views of one of the large support blocks illustrated in FIG. 1.
Figure 25:
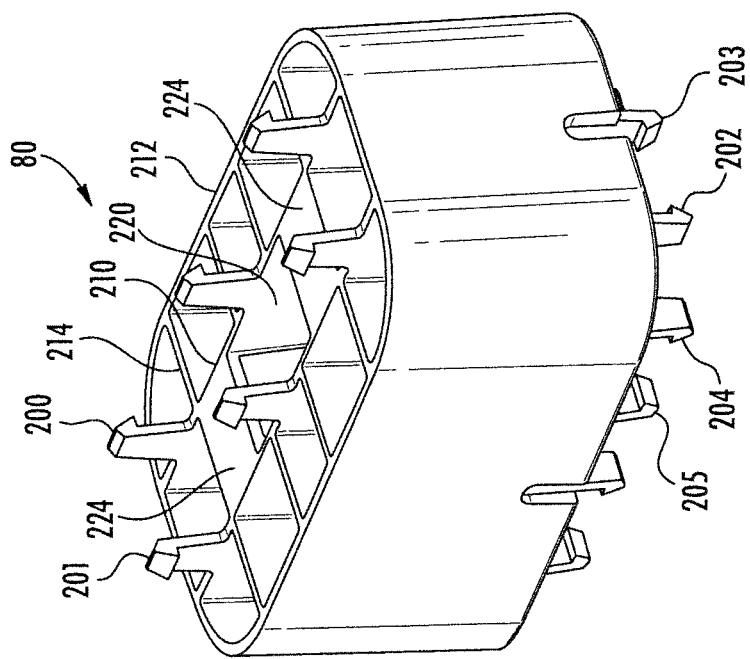

Referring now to FIGS. 25, 26, each support block 80 further includes a first plurality of additional lower tabs 204 extending outwards from the lower surfaces of the ribs 240. Each tab 204 includes an angled contact surface 231 for engaging the bottom deck tab openings 221. A second plurality of additional lower tabs 205 extend outwards from the lower surfaces of the ribs 240. Each tab 205 includes an angled contact surface 233 for engaging the bottom deck tab openings 221. The angled contact surfaces 231, 233 of the first and second additional lower tabs 204, 205 face towards each other.

The lower tabs 202, 203 are aligned with the upper tabs 200, 201. The additional lower snaps 204, 205 are also grouped together in pairs facing one another. The orientation of the additional lower snaps 204, 205 is orthogonal to the lower snaps 202, 203.

Referring now to FIG. 32, the additional lower tabs 204, 205 are inserted into bottom deck tab openings 221 in the bottom deck 70. Each tab opening 244 includes a flange 234 recessed therein. Each additional lower tab 204, 205 is flexible for engaging the flange 234.

Half of the snap openings 221 are adjacent the channels 72 that are to receive the support structure 110. The other half of the snap openings 219 are parallel to and spaced away from the channels 72.

Referring now to FIGS. 33-38, the small support blocks 90 will be discussed in greater detail. The small support blocks 90 advantageously include snaps 250, 252 for engaging the top and bottom decks 60, 70. The snaps 250, 252 may also be referred to as tabs 250, 252.

Should any one of the support blocks 90 become damaged, the top and bottom decks 60, 70 may be separated from the support blocks 80, 90 via their corresponding snaps so that the damaged support block 90 may be replaced.

Each small support block 90 includes an inner wall 260 and an outer wall 262 with ribs 264 extending therebetween. The upper snaps 250 are grouped together in pairs and face each other. The lower snaps 252 are also grouped together in pairs and face each other. The lower snaps 252 are positioned inwards from the upper snaps 250.

An interior 270 of the support block 90 is open and does not include any ribs. The bottom of the interior 270 is closed off via contact surface 272 on the lower surface of the support block 90. Adjacent the interior 270 at an upper surface of the support block 90 are contact surfaces 274. The contact surfaces 274 are between the inner wall 260 and the interior 270.

Figure 38:
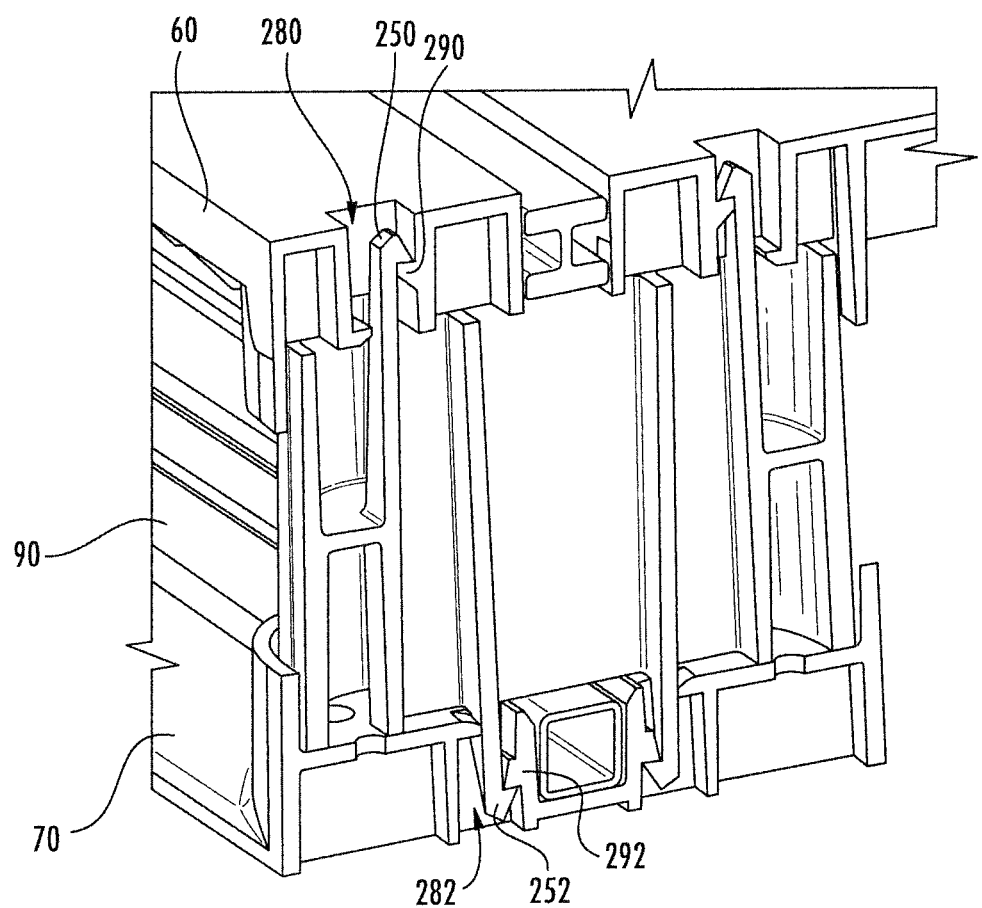
FIG. 38 is a partial cross-sectional view of the plastic pallet illustrated in FIG. 1 through one of the small support blocks.

Referring now to FIG. 38, each snap opening 280 adjacent a support structure member 100 in the top deck 60 includes a lip or protrusion 290 recessed therein. Each upper snap 250 is flexible for engaging the lip 290.

There is a corresponding snap opening 282 in the bottom deck 70 that also includes a lip or protrusion 292 recessed therein. Each lower snap 252 is flexible for engaging the lip 292. Each snap opening 282 is adjacent the support structure 110 in the bottom deck 70.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A pallet comprising:
   a top deck having an upper surface and an opposing lower surface, and including a plurality of grommet openings extending therethrough, with each grommet opening including a divider; and
   a plurality of grommets inserted into the plurality of grommet openings, each grommet comprising:
      an upper section having an outer exposed surface extending above the upper surface of said top deck, and
      at least one lower section split by the divider within each respective grommet opening, and having an outer exposed surface extending below the lower surface of said top deck.

2. The pallet according to claim 1 wherein the at least one lower section includes a lip resting on the lower surface of said top deck.

3. The pallet according to claim 1 wherein each grommet opening includes a recessed shelf below the upper surface of said top deck, and wherein the upper section of each grommet includes a lower lip resting on the recessed shelf.

4. The pallet according to claim 3 wherein each grommet further includes at least one mid-section adjacent the lower lip and extending between the upper section and the at least one lower section.

5. The pallet according to claim 4 wherein the at least one mid-section includes a pair of spaced apart mid-sections, with each mid-section being separated by said divider; and wherein said at least one lower section comprises a pair of lower sections, with each lower section extending from a respective mid-section.

6. The pallet according to claim 1 wherein said divider includes a lower surface even with the underside of said top deck.

7. The pallet according to claim 1 wherein said divider includes an upper surface that is below the recessed shelf.

8. The pallet according to claim 1 wherein the plurality of grommet openings are spaced adjacent a perimeter of said top deck.

9. The pallet according to claim 1 wherein each grommet opening and each grommet is rectangular shaped.

10. The pallet according to claim 1 wherein each grommet comprises at least one of natural rubber and synthetic rubber.

11. The pallet according to claim 1 wherein said top deck comprises plastic.

12. A method for making a pallet comprising:
forming a top deck having an upper surface and an opposing lower surface, with the top deck including a plurality of grommet openings extending therethrough, with each grommet opening including a divider; and
inserting a plurality of grommets into the plurality of grommet openings, each grommet comprising:
an upper section having an outer exposed surface extending above the upper surface of the top deck, and
at least one lower section split by the divider within each respective grommet opening, and having an outer exposed surface extending below the lower surface of the top deck.

13. The method according to claim 12 wherein the at least one lower section includes a lip resting on the lower surface of the top deck.

14. The method according to claim 12 wherein each grommet opening includes a recessed shelf below the upper surface of the top deck, and wherein the upper section of each grommet includes a lower lip resting on the recessed shelf.

15. The method according to claim 14 wherein each grommet further includes at least one mid-section adjacent the lower lip and extending between the upper section and the at least one lower section.

16. The method according to claim 15 wherein the at least one mid-section includes a pair of spaced apart mid-sections, with each mid-section being separated by the divider; and wherein the at least one lower section comprises a pair of lower sections, with each lower section extending from a respective mid-section.

17. The method according to claim 12 wherein the divider includes a lower surface even with the underside of the top deck.

18. The method according to claim 12 wherein the divider includes an upper surface that is below the recessed shelf.

19. The method according to claim 12 wherein the plurality of grommet openings are spaced adjacent a perimeter of the top deck.

20. The method according to claim 12 wherein each grommet opening and each grommet is rectangular shaped.

* * * * *